(12) United States Patent
Kinoshita et al.

(10) Patent No.: US 7,107,247 B2
(45) Date of Patent: Sep. 12, 2006

(54) ELECTRONIC VALUE SYSTEM

(75) Inventors: Masaki Kinoshita, Tokyo (JP); Tetsuya Yamashita, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 567 days.

(21) Appl. No.: 10/048,326

(22) PCT Filed: May 30, 2001

(86) PCT No.: PCT/JP01/04538

§ 371 (c)(1),
(2), (4) Date: Jan. 25, 2002

(87) PCT Pub. No.: WO01/93139

PCT Pub. Date: Dec. 6, 2001

(65) Prior Publication Data

US 2002/0116344 A1    Aug. 22, 2002

(30) Foreign Application Priority Data

May 31, 2000  (JP) .............................. 2000-163676

(51) Int. Cl.
*G06Q 90/00* (2006.01)
*H04L 9/00* (2006.01)

(52) U.S. Cl. ........................................ 705/64; 713/168
(58) Field of Classification Search ............ 705/26–27, 705/39–44, 64–79; 713/155–194, 200–202; 380/229–233, 28–30; 707/9–10, 100–104; 235/375–382; 902/1–8, 22; 725/1–6
See application file for complete search history.

(56) References Cited

U.S. PATENT DOCUMENTS

| 5,412,726 | A | | 5/1995 | Nevoux et al. | |
|---|---|---|---|---|---|
| 5,511,121 | A | | 4/1996 | Yacobi | 705/69 |
| 5,633,930 | A | * | 5/1997 | Davis et al. | 705/68 |
| 5,745,886 | A | | 4/1998 | Rosen | |
| 5,796,841 | A | * | 8/1998 | Cordery et al. | 380/55 |
| 6,039,250 | A | | 3/2000 | Ito et al. | |

FOREIGN PATENT DOCUMENTS

| EP | 772165 A2 * | 5/1997 |
|---|---|---|
| EP | 0 950 968 A1 | 10/1999 |
| EP | 1 077 425 A1 | 2/2001 |
| JP | 62-243097 | 10/1987 |
| KR | 1999-022340 | 3/1999 |
| KR | 1999-028355 | 4/1999 |
| WO | WO 93/08545 A1 | 4/1993 |
| WO | WO 97/45814 | 12/1997 |
| WO | WO 99/09502 A1 | 2/1999 |
| WO | WO 99/24892 A2 | 5/1999 |
| WO | WO 99/46714 A1 | 9/1999 |
| WO | WO 01/22342 A1 | 3/2001 |

OTHER PUBLICATIONS

Addelson et al., "Internet Security Safegurads", Mar. 1998, Network VAR, v6, n3, p. 50 (6), ISSN: 1082-8818.*

* cited by examiner

*Primary Examiner*—Mary D. Cheung
(74) *Attorney, Agent, or Firm*—Brinks Hofer Gilson & Lione

(57) ABSTRACT

An electronic value amount of an electronic bank account and an electronic value amount stored in user identification module UIM in mobile station MS are each stored in an electronic bank server EBS, and updated by the server when either amount changes as a result of transaction.

7 Claims, 18 Drawing Sheets

FIG. 3

| SERIAL NUMBER | DATA NAME | DESCRIPTION |
|---|---|---|
| 1 | PRIVATE SIGNATURE KEY | PRIVATE KEY FOR DIGITALLY SIGNING TO DATA WHICH ELECTRONIC BANK SERVER EBS TRANSMITS |
| 2 | PRIVATE DECRYPTION KEY | PRIVATE KEY FOR DECRYPTING ENCRYPTED MESSAGE WHICH ELECTRONIC BANK SERVER EBS RECEIVES |
| 3 | CA SIGNATURE VERIFICATION CERTIFICATE | CERTIFICATE FOR PUBLIC KEY FOR VERIFYING DIGITAL SIGNATURES PROVIDED ON VARIOUS CERTIFICATES BY CERTIFICATE AUTHORITY SERVER CA. |
| 4 | ELECTRONIC VALUE MANAGEMENT INFORMATION | INFORMATION TO MANAGE ELECTRONIC VALUE IN ELECTRONIC PURSE AND ELECTRONIC BANK ACCOUNT. |

FIG. 4

| SERIAL NUMBER | DATA NAME | DESCRIPTION |
|---|---|---|
| 1 | ELECTRONIC BANK ID | IDENTIFICATION INFORMATION TO IDENTIFY ELECTRONIC BANK SERVER EBS WHICH ISSUED ELECTRONIC VALUE. |
| 2 | ELECTRONIC BANK ACCOUNT NUMBER | IDENTIFICATION INFORMATION FOR ELECTRONIC BANK ACCOUNT |
| 3 | ELECTRONIC VALUE AMOUNT IN ELECTRONIC BANK ACCOUNT | BALANCE INFORMATION OF ELECTRONIC VALUE IN ELECTRONIC BANK ACCOUNT WHEN MOBILE STATION MS ACCESSES ELECTRONIC BANK SERVER EBS AT TRANSACTION END |
| 4 | ELECTRONIC VALUE AMOUNT IN UIM | BALANCE INFORMATION OF ELECTRONIC VALUE STORED IN USER IDENTITY MODULE 1 UIM1 WHEN MOBILE STATION MS ACCESSES ELECTRONIC BANK SERVER EBS AT TRANSACTION END. |
| 5 | TIME STAMP AT UPDATE OF ELECTRONIC VALUE AMOUNT | GIVEN DATE AND TIME INFORMATION BY ELECTRONIC BANK SERVER EBS WHEN ELECTRONIC VALUE AMOUNT IN ABOVE 4 IS UPDATED BY ELECTRONIC BANK SERVER EBS. |
| 6 | CURRENT ELECTRONIC VALUE AMOUNT IN ELECTRONIC BANK ACCOUNT | CURRENT BALANCE INFORMATION OF ELECTRONIC VALUE IN ELECTRONIC BANK ACCOUNT. |
| 7 | CURRENT ELECTRONIC VALUE AMOUNT IN UIM | BALANCE INFORMATION OF ELECTRONIC VALUE WHICH SHOULD BE REFLECTED ON USER IDENTITY MODULE 1 UIM1. |
| 8 | TIME STAMP AT UPDATE OF CURRENT ELECTRONIC VALUE AMOUNT | GIVEN DATE AND TIME INFORMATION BY ELECTRONIC BANK SERVER EBS WHEN ELECTRONIC VALUE AMOUNT IN ABOVE 6 AND 7 IS UPDATED BY ELECTRONIC BANK SERVER EBS. |
| 9 | ELECTRONIC VALUE UPDATE HISTORY | UPDATE HISTORY FOR ELECTRONIC VALUE AMOUNT IN USER IDENTITY MODULE UIM AT THE POINT WHEN MOBILE STATION MS LAST ACCESSES ELECTRONIC BANK SERVER EBS. |

*FIG. 5*

| SERIAL NUMBER | DATA NAME | DESCRIPTION |
|---|---|---|
| 1 | ELECTRONIC BANK ID | ELECTRONIC BANK SERVER EBS IDENTIFICATION INFORMATION WHICH ISSUED ELECTRONIC VALUE. |
| 2 | PREPAID CARD ID | IDENTIFICATION INFORMATION FOR PREPAID CARD. |
| 3 | ELECTRONIC VALUE AMOUNT IN PREPAID CARD | BALANCE INFORMATION OF ELECTRONIC VALUE IN ELECTRONIC BANK ACCOUNT WHEN MS ACCESSES ELECTRONIC BANK SERVER EBS AT TRANSACTION END. |
| 4 | TIME STAMP AT UPDATE OF ELECTRONIC VALUE AMOUNT | GIVEN DATE AND TIME INFORMATION BY ELECTRONIC BANK SERVER EBS WHEN ELECTRONIC VALUE AMOUNT IN ABOVE 3 IS UPDATED BY ELECTRONIC BANK SERVER EBS. |
| 5 | CURRENT ELECTRONIC VALUE AMOUNT IN PREPAID CARD | BALANCE INFORMATION OF ELECTRONIC VALUE IN CURRENT PREPAID CARD. |
| 6 | TIME STAMP AT UPDATE OF CURRENT ELECTRONIC VALUE AMOUNT | GIVEN DATE AND TIME INFORMATION BY ELECTRONIC BANK SERVER EBS WHEN ELECTRONIC VALUE AMOUNT IN ABOVE 5 IS UPDATED BY ELECTRONIC BANK SERVER EBS. |
| 7 | ELECTRONIC VALUE UPDATE HISTORY | UPDATE HISTORY FOR ELECTRONIC VALUE AMOUNT IN PREPAID CARD AT THE POINT WHEN MOBILE STATION MS OWNED BY PREPAID CARD PC OWNER LAST ACCESSES ELECTRONIC BANK SERVER EBS. |

*FIG. 7*

| SERIAL NUMBER | DATA NAME | DESCRIPTION |
|---|---|---|
| 1 | PRIVATE SIGNATURE KEY | PRIVATE KEY FOR DIGITALLY SIGNING TO DATA WHICH ELECTRONIC BANK SERVER EBS TRANSMITS |
| 2 | PRIVATE DECRYPTION KEY | PRIVATE KEY FOR DECRYPTING AN ENCRYPTED MESSAGE WHICH ELECTRONIC BANK SERVER EBS RECEIVES |
| 3 | EB SIGNATURE VERIFICATION CERTIFICATE | CERTIFICATE FOR PUBLIC KEY TO VERIFY DIGITAL SIGNATURE GIVEN BY ELECTRONIC BANK SERVER EBS |
| 4 | ENCRYPTION CERTIFICATE FOR EB | CERTIFICATE FOR PUBLIC KEY TO ENCRYPT DATA TO TRANSMIT TO ELECTRONIC BANK SERVER EBS |
| 5 | CA SIGNATURE VERIFICATION CERTIFICATE | CERTIFICATE FOR PUBLIC KEY FOR VERIFYING DIGITAL SIGNATURES PROVIDED ON VARIOUS CERTIFICATES BY CERTIFICATE AUTHORITY SERVER CA. |
| 6 | USER ID | IDENTIFICATION INFORMATION FOR MOBILE STATION MS USER |
| 7 | ELECTRONIC VALUE INFORMATION | INFORMATION ON USER IDENTITY MODULE 1 UIM1 AND ELECTRONIC VALUE IN ELECTRONIC BANK ACCOUNT |

FIG. 8

| SERIAL NUMBER | DATA NAME | DESCRIPTION |
|---|---|---|
| 1 | ELECTRONIC BANK ID | IDENTIFICATION INFORMATION TO SPECIFY ELECTRONIC BANK WHICH ISSUED ELECTRONIC VALUE. |
| 2 | ELECTRONIC PURSE TYPE | INFORMATION TO SHOW TYPE WHETHER ELECTRONIC PURSE IS USER IDENTITY MODULE 1 UIM1 OR PREPAID CARD PC. |
| 3 | ELECTRONIC BANK ACCOUNT NUMBER | IDENTIFICATION INFORMATION TO SPECIFY ELECTRONIC BANK ACCOUNT IN ELECTRONIC BANK SERVER EBS |
| 4 | ELECTRONIC BANK SIGNATURE SGN1 | DIGITAL SIGNATURE GIVEN BY ELECTRONIC BANK SERVER EBS TO GUARANTEE ABOVE 1-3 ARE NOT MANIPULATED |
| 5 | ELECTRONIC VALUE AMOUNT IN ELECTRONIC BANK ACCOUNT | BALANCE INFORMATION OF ELECTRONIC VALUE IN ELECTRONIC BANK ACCOUNT WHEN MOBILE STATION MS ACCESSES ELECTRONIC BANK SERVER EBS AT TRANSACTION END. |
| 6 | ELECTRONIC VALUE AMOUNT IN UIM | BALANCE INFORMATION OF ELECTRONIC VALUE STORED IN USER IDENTITY MODULE 1 UIM1 WHEN MOBILE STATION MS ACCESSES ELECTRONIC BANK SERVER EBS AT TRANSACTION END. |
| 7 | TIME STAMP AT UPDATE OF ELECTRONIC VALUE AMOUNT | GIVEN DATE AND TIME INFORMATION BY ELECTRONIC BANK SERVER EBS WHEN ELECTRONIC VALUE AMOUNT IN USER IDENTITY MODULE 1 UIM1 IS UPDATED. |
| 8 | ELECTRONIC BANK SIGNATURE SGN2 | DIGITAL SIGNATURE GIVEN BY ELECTRONIC BANK SERVER EBS TO GUARANTEE ABOVE 1-3 AND 5-7 ARE NOT MANIPULATED |
| 9 | CURRENT ELECTRONIC VALUE AMOUNT | CURRENT BALANCE INFORMATION OF ELECTRONIC VALUE IN USER IDENTITY MODULE 1 UIM1. |
| 10 | ELECTRONIC VALUE UPDATE HISTORY | UPDATE HISTORY OF ELECTRONIC VALUE IN USER IDENTITY MODULE 1 UIM1 AT THE POINT WHEN MOBILE STATION MS LAST ACCESSES ELECTRONIC BANK SERVER EBS. |

FIG.9

| SERIAL NUMBER | DATA NAME | DESCRIPTION |
|---|---|---|
| 1 | RECIPIENT ELECTRONIC BANK ACCOUNT NUMBER | ELECTRONIC BANK ACCOUNT NUMBER FOR PERSON WHO RECEIVES ELECTRONIC VALUE. |
| 2 | PAYER ELECTRONIC BANK ACCOUNT NUMBER | ELECTRONIC BANK ACCOUNT NUMBER FOR PERSON WHO PAYS ELECTRONIC VALUE. |
| 3 | PAYER PREPAID CARD ID | PREPAID CARD ID WHEN ELECTRONIC VALUE IS PAID BY PREPAID CARD. |
| 4 | TRANSACTED VALUE AMOUNT | TRANSACTED VALUE AMOUNT TRANSACTED BETWEEN RECIPIENT AND PAYER OF ELECTRONIC VALUE |
| 5 | TRANSACTION PARTNER DIGITAL SIGNATURE | DIGITAL SIGNATURE FOR TRANSACTION PARTNER |

FIG.10

| SERIAL NUMBER | DATA NAME | DESCRIPTION |
|---|---|---|
| 1 | EB SIGNATURE VERIFICATION CERTIFICATE | CERTIFICATE FOR PUBLIC KEY TO VERIFY DIGITAL SIGNATURE GIVEN BY ELECTRONIC BANK SERVER EBS |
| 2 | ENCRYPTION CERTIFICATE FOR EB | CERTIFICATE FOR PUBLIC KEY TO ENCRYPT DATA TO TRANSMIT TO ELECTRONIC BANK SERVER EBS |
| 3 | CA SIGNATURE VERIFICATION CERTIFICATE | CERTIFICATE FOR PUBLIC KEY FOR VERIFYING DIGITAL SIGNATURES PROVIDED ON VARIOUS CERTIFICATES BY CERTIFICATE AUTHORITY SERVER CA. |
| 4 | ELECTRONIC VALUE INFORMATION | INFORMATION ON ELECTRONIC VALUE IN PREPAID CARD |

*FIG. 11*

| SERIAL NUMBER | DATA NAME | DESCRIPTION |
|---|---|---|
| 1 | ELECTRONIC BANK ID | IDENTIFICATION INFORMATION TO IDENTIFY ELECTRONIC BANK SERVER EBS WHICH ISSUED ELECTRONIC VALUE. |
| 2 | ELECTRONIC PURSE TYPE | INFORMATION TO SHOW TYPE WHETHER ELECTRONIC PURSE IS USER IDENTITY MODULE 1 UIM1 OR PREPAID CARD PC. |
| 3 | PREPAID CARD ID | IDENTIFICATION INFORMATION TO SPECIFY PREPAID CARD PC. |
| 4 | ELECTRONIC BANK SIGNATURE SGN3 | DIGITAL SIGNATURE GIVEN BY ELECTRONIC BANK SERVER EBS TO GUARANTEE ABOVE 1-3 ARE NOT MANIPULATED. |
| 5 | ELECTRONIC VALUE AMOUNT IN PREPAID CARD | BALANCE INFORMATION OF ELECTRONIC VALUE STORED IN PREPAID CARD PC WHEN MOBILE STATION MS OWNED BY PREPAID CARD PC OWNER ACCESSES ELECTRONIC BANK SERVER EBS AT TRANSACTION END. |
| 6 | TIME STAMP AT UPDATE OF ELECTRONIC VALUE AMOUNT | GIVEN DATE AND TIME INFORMATION BY ELECTRONIC BANK SERVER EBS WHEN ELECTRONIC VALUE AMOUNT IN ABOVE 4 IS UPDATED BY ELECTRONIC BANK SERVER EBS. |
| 7 | ELECTRONIC BANK SIGNATURE SGN4 | DIGITAL SIGNATURE GIVEN BY ELECTRONIC BANK SERVER EBS TO GUARANTEE ABOVE 1-3 AND 5-7 ARE NOT MANIPULATED. |
| 8 | CURRENT ELECTRONIC VALUE AMOUNT | CURRENT ELECTRONIC VALUE AMOUNT IN PREPAID CARD PC. |
| 9 | ELECTRONIC VALUE UPDATE HISTORY | UPDATE HISTORY OF ELECTRONIC VALUE AMOUNT IN PREPAID CARD PC AT THE POINT WHEN MOBILE STATION MS LAST ACCESSES ELECTRONIC BANK SERVER EBS. | ns
ELECTRONIC VALUE SYSTEM

TECHNICAL FIELD

The present invention relates to an electronic value system for performing electronic transactions by utilizing electronic values.

BACKGROUND ART

Various systems exist for performing cashless shopping. These systems utilize so-called electronic money (hereafter referred to as an electronic value). However, since an electronic value is comprised of data, there is a danger that such a value may be improperly used or manipulated by unauthorized persons posing as claimants or owners. It is therefore necessary to devise an operating system which is able to provide security for cashless transactions, and to prevent problems of misuse and fraud.

However, in providing such a system a drawback is encountered in that transactions become more complicated and time consuming, and less efficient.

DISCLOSURE OF INVENTION

The present invention has been made with a view to overcoming the above-mentioned problems, and has as its object the provision of a secure and efficient electronic value system which utilizes a communication terminal and a server.

To achieve these aims, the present invention provides an electronic value system which comprises of a plurality of communication terminals, acting as an electronic purse, each having a memory for storing an electronic value and a communication means for performing transmission and reception of the electronic value to outside nodes. An electronic bank account holding means in a server on a network for accumulating electronic values in an electronic bank account assigned to a user. A transfer means for transferring, via the network, an electronic value to a memory of one of the electronic communication terminals from the electronic bank account holding means. A transaction log notification means which shows transaction details when a transaction using an electronic value by the communication terminal is performed. A purse balance information management means, provided in the network, for memorizing balance information of an electronic value stored in a memory of the communication terminal; and updating balance information of an electronic value related to a transaction log upon receiving a transaction log transmitted from a transaction log notification means.

In accordance with the present invention, a purse balance information management means memorizes balance information of an electronic value in an electronic bank account and the balance information of the electronic value stored in a communication terminal functioning as an electronic purse; and updates balance information of the electronic value in the communication terminal when transaction contents change, thereby enabling the detection of any improper transcription of the electronic value in a communication terminal.

In the preferred embodiment of the present invention, the plurality of communication terminals in the electronic value system include a first communication terminal and a second communication terminal, each of which performs transmission and reception of an electronic value. Wherein the first communication terminal transmits its own identification information and electronic value stored in the memory to the second communication terminal; and the second communication terminal receives the identification information of the electronic value transmitted from the first communication terminal and transmits its own identification information to the first communication terminal; and wherein the transaction log notification means further transmits the electronic value amount for which transmission and reception are performed along with identification information of the first and second communication terminal from either the first communication terminal or the second communication terminal, at least to the purse balance information management means as a transaction log; and the purse balance information management means updates balance information of the electronic value based on the transmitted transacted log.

In accordance with the system of the present invention, when the first communication terminal and the second communication terminal perform transmission and reception of an electronic value between each other, the balance information of an electronic value stored in the communication terminal is updated in a transaction log provided by either the first communication terminal or the second communication terminal. In other words, the transmission log can be transmitted by either one of the communication terminals whereby processing efficiency is improved.

In the preferred embodiment of the present invention, the first communication terminal and the second communication terminal each include a log accumulation means for accumulating the transaction log related to their own transaction, and when either the first communication terminal or the second communication terminal accumulates the transaction log equal in volume to a storage capacity by the log accumulation means, transmission and reception of electronic value to outside nodes are not performed.

Also, in another preferred embodiment, the first communication terminal and the second communication terminal each comprise a log accumulation means for accumulating the transaction log related to their own transaction, and when either the first communication terminal or the second communication terminal accumulates the transaction logs equal in volume to a memory capacity by the log accumulation means, the transaction logs having a date and time prior to that of a current date and time are erased during a transaction in which a current transaction log is accumulated.

Further, in another preferred embodiment, the first communication terminal and the second communication terminal comprise the log accumulation means accumulating the transaction log related to their own transaction, the transaction log notification means transmits the transaction log to the purse balance information management means when accumulating the transaction log equal in volume to a storage capacity by the log accumulation means in either the first communication terminal or second communication terminal at least.

In the various embodiments of electronic value system, described above, for example, the communication terminal is a mobile communication terminal stored in a mobile network, the network is a mobile network, and the first communication terminal and second communication terminal can communicate by radio. Also, a memory of the communication terminal may be an IC card installed in the communication terminal. Also, the communication terminal may attach a transmission date and time to the electronic value when transmitting the electronic value. Also, the communication terminal may provide a security means for performing electronic authentication, encryption and decryption by using a key for the electronic value, and an update means to update the key regularly when performing transmission and reception of the electronic value.

Also, the present invention provides an electronic value system for performing transmission and reception of an electronic value between the first communication terminal and the second communication terminal, wherein the first communication terminal includes electronic value system comprising a memory for storing the electronic value, identification information of the issuer who issued the electronic value, and a digital signature provided by the issuer to the identification information, and a transmission means for transmitting the identification information of the issuer and a digital signature with the stored electronic value to the second communication terminal, with the second communication terminal including an electronic value system comprising a receiving means for receiving identification information of the issuer and a digital signature, and a confirmation means for confirming validity of the first communication terminal by verifying the received digital signature, and by confirming that the electronic value transmitted from the first communication terminal is issued by the issuer.

In a related system, when the first communication terminal and the second communication terminal perform reception and transmission of an electronic value between each other, on one hand, the first communication terminal adds identification information and a digital signature of the issuer to the electronic value for transmission. On the other hand, a second communication terminal confirms the correctness of the received electronic value by verifying identification information of issuer and digital signature. The correctness of the electronic value will be confirmed only between the two communication terminals whereby improved security and efficiency for an electronic value can be obtained. Also, when the first communication terminal and the second communication terminal perform reception and transmission of an electronic value between each other, on one hand, the first communication terminal adds identification information and a digital signature of the issuer to the electronic value for transmission. On the other hand, a second communication terminal confirms the correctness of the received electronic value by verifying identification information of issuer and digital signature. The correctness of the electronic value will be confirmed only between the two communication terminals whereby improved security and efficiency for an electronic value can be obtained.

In the preferred embodiment, the second communication terminal comprises a memory for storing the electronic value, identification information of the issuer who issued the electronic value, and a digital signature transmitted by the issuer for the identification information, and a transmission means for transmitting identification information of the issuer stored previously and a digital signature to the first communication terminal further, and the first communication terminal comprises an obtaining means for obtaining a digital signature provided by the issuer to identification information of the issuer in a memory of the second communication terminal, and the identification information before transmitting the electronic value to the second communication terminal, and a confirmation means for confirming authenticity of the second communication terminal by verifying the obtained digital signature, and by confirming that the electronic value in memory of the second communication terminal is issued by the issuer.

Also, in the electronic value system, the first communication terminal and the second communication terminal include a log accumulation means for accumulating the transaction log related to their own transaction, and either the first communication terminal or the second communication terminal transmits the accumulated transaction log to outside nodes managing balance information of electronic value which the first or the second communication terminal memorizes when accumulating the transaction log equal in volume to a storage capacity by the log accumulation means.

Also, the first communication terminal and the second communication terminal may perform transmission and reception of the electronic value by radio. Either of the first communication terminal or the second communication terminal may be a mobile communication terminal provided in a mobile network. In addition, the second communication terminal may be installed in a vending machine. Also, the communication terminals may attach a transmission date and time to the electronic value when transmitting the electronic value. Further, the communication terminal may include a security means for performing a process of electronic certification, encryption and decryption by using a key for the electronic value; and an update means for regularly updating the key when performing transmission and reception of the electronic value.

Also, the present invention provides a communication terminal providing a memory for storing an electronic value which is electronic money information and its own identification information therefor, a communication means for performing transmission and reception of the electronic value between outside nodes, an identification information exchange means for providing its own identification information stored in the memory to the outside nodes, and to obtain identification information of the outside nodes from the outside nodes, and a log accumulation means, as a transaction log, for accumulating the electronic value amount whose transmission and reception are performed between the outside nodes, the identification information, and identification information of the outside nodes.

In the preferred embodiment, a communication terminal does not perform transmission and reception of the electronic value between the outside nodes when it accumulates a transaction log equal in volume to a storage capacity of the memory accumulation means.

In this case, when a communication terminal accumulates the transaction log equal in volume to a storage capacity of the log accumulation means, the accumulated transaction log with an older transmission date and time may be erased in transmission and reception of the electronic value after accumulating the transaction log. Also, a communication terminal may transmit the accumulated transaction log to an outside device for confirming authenticity for transmission and reception of the electronic value by using the transaction log before erasing the accumulated transaction log.

In the preferred embodiment, a communication terminal includes a security means for performing a process of electronic authentication, encryption and decryption by using a key for the electronic value; and an update means for updating regularly the key when performing transmission and reception of the electronic value. Also, in another preferred embodiment, when a communication terminal transmits the electronic value to the outside nodes, the communication terminal attaches the transmission date and time to the electronic value. Further, in another preferred embodiment, the communication means performs transmission and reception of the electronic value between outside nodes by radio. The communication terminal is a mobile communication terminal stored in a mobile network, and the memory is an IC card installed in the communication terminal.

Also, the present invention provides a communication terminal including a memory for storing an electronic value which is electronic money information; identification information of an issuer of the electronic value, and a digital signature provided by the issuer to the identification information; a communication means for performing transmission and reception of the electronic value between outside nodes; an attachment means for attaching identification information of the issuer and the digital signature to electronic value transmitted to the outside nodes by the communication means, and a confirmation means for confirming authenticity of the electronic value by verifying identification information of the issuer to be attached to the electronic value received from the outside nodes by the communication means, and the digital signature.

In the preferred embodiment, the communication terminal includes a security means for performing a process of electronic authentication, encryption and decryption of the electronic value by using a key; and an update means for regularly updating the key when performing transmission and reception of the electronic value.

When a communication terminal transmits the electronic value to the outside nodes, a communication terminal may attach a transmission date and time to the electronic value. The communication means may perform transmission and reception of the electronic value between the outside nodes by radio. The communication terminal is, for example, a mobile communication terminal stored in a mobile network, and the memory is an IC card installed in the communication terminal.

Also, the present invention is a server for memorizing electronic value which is electronic money information, and provides a transfer means for transferring electronic value accumulated by the electronic bank account holding means via the network to an electronic bank account holding means for accumulating the electronic value into an electronic bank account assigned to user, a memory for storing the electronic value and a communication terminal holding a communication means for performing transmission and reception of the electronic value between the outside nodes; and a purse balance information management means for memorizing balance information of electronic value stored in a memory of the communication terminal; and a log obtaining means for obtaining a transaction log showing details of a transaction by using the electronic value in the communication terminal via the network from the communication terminal; and a purse balance information update means for updating balance information of the electronic value memorized by the purse balance information memory means on a basis of the obtained transaction log.

In the preferred embodiment, the server comprises an electronic authentication means for giving an electronic authentication by a key which the server memorizes for the transmitted electronic value information.

BRIEF DESCRIPTION OF THE DRAWINGS

FIG. 3 is a diagram explaining memory content of the database in an electronic bank server according to the embodiment of the present invention.

FIG. 4 is a diagram explaining a memory content of the database in an electronic bank server according to the embodiment of the present invention.

FIG. 5 is a diagram explaining memory content of the database in an electronic bank server according to the embodiment of the present invention.

FIG. 7 is a diagram explaining memory content of UIM according to the embodiment of the present invention.

FIG. 8 is a diagram explaining memory content of UIM according to the embodiment of the present invention.

FIG. 9 is a diagram explaining memory content of UIM according to the embodiment of the present invention.

FIG. 10 is a block diagram explaining memory content of a prepaid card according to the embodiment of the present invention.

FIG. 11 is a block diagram explaining memory content of a prepaid card according to the embodiment of the present invention.

BEST MODE FOR CARRYING OUT THE INVENTION

Embodiments of the present invention will be described with reference to the drawings.

In this embodiment, an electronic bank account for each user at an electronic bank provided on a network is opened, and a mobile station which each user owns is used as an electronic purse. A function of electronic authentication, encryption and decryption based on RSA public key encryption system of PKI base (Public Key Infrastructure) should be activated in an exchange for this electronic value.

A: Configuration

At first, the configurations of this embodiment will be described.

Figure 1:
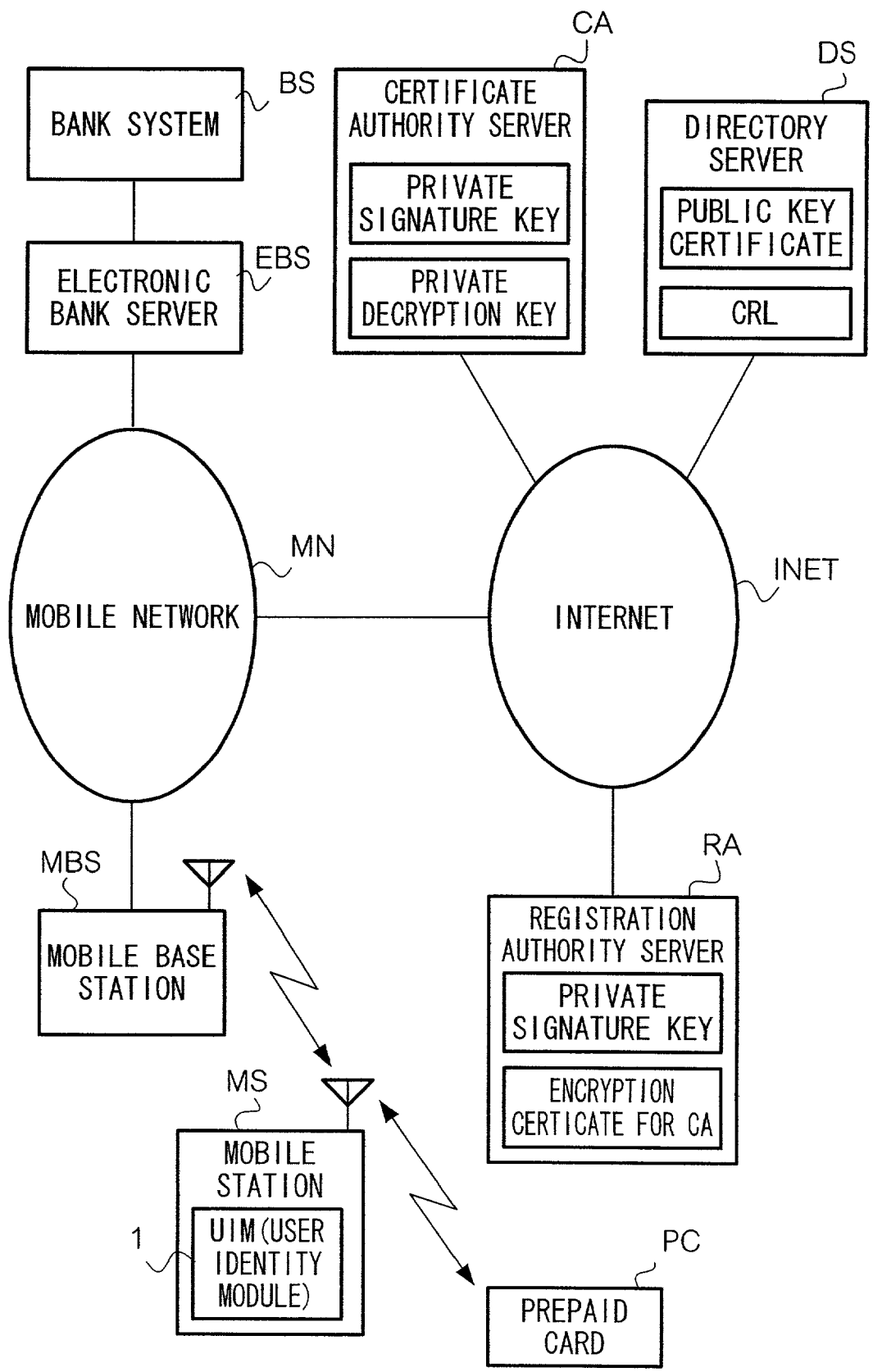
FIG. 1 is a block diagram illustrating the configuration of the overall system according to the embodiment of the present invention.

FIG. 1 is a block diagram illustrating the configuration of the overall system according to the embodiment of the present invention. As shown in this figure, this system is configured by mobile station MS, mobile network MN, prepaid card PC, electronic bank server EBS, banking system BS, internet INET, registration authority server RA, certificate authority server CA, and directory server DS.

Prepaid card PC is a non-contact IC card for storing electronic value Information. This prepaid card PC comprises a function for transmitting stored electronic value information to the outside nodes by radio, and functions as an electronic purse for a user. In this embodiment, for example, infrared rays like IrDA (Infrared Data Association) and the like are used.

Mobile station MS is, for example, a cellular telephone, and performs sound communication and data communication via mobile network MN. This mobile station MS installs an IC card memorizing electronic value information, and performing input and output with regard to electronic value. This IC card will be referred to as UIM (User Identity Module) 1 hereafter. A user can operate this mobile station MS as an electronic purse by attaching this UIM1 to mobile station MS.

Concretely, the mobile station MS reads out electronic value information in UIM1, and actualizes various transactions by exchanging this information with outside nodes. There are two forms of exchange for this electronic value;

1. Performing transmission and reception of electronic value information to an electronic bank server or other mobile stations via mobile network,
2. Performing transmission and reception of electronic value information transmitted from prepaid card PC by infrared rays.

The mobile network MN comprises a mobile base station MBS and an exchange station not shown here, and provides sound communication service and data communication service to the mobile station MS. This mobile network MN is connected to internet INET via gateway device not shown here.

An electronic bank server EBS is connected to a mobile network MN and a bank system BS installed in a bank (not shown here) by a private line. A virtual bank account (hereafter referred to as Electronic Bank Account) assigned to each user is opened in this electronic bank server EBS. The electronic bank server EBS memorizes electronic value information, such as an electronic bank account number to specify electronic bank account and balance information of electronic value in the electronic bank account, and performs a process for depositing, withdrawing and transferring electronic value and the like in the electronic bank account in response to a request from mobile station MS.

Also, the electronic bank server EBS memorizes an electronic bank account, and the balance information of electronic value in an electronic purse, such as a mobile station MS and a prepaid card PC; and updates balance information by notifying the electronic bank server EBS from the electronic purses. Accordingly, an electronic bank server EBS can detect incorrect transcriptions by comparing the balance information which the electronic bank server EBS memorizes in case the electronic value is transcribed incorrectly on the electronic purse, such as a mobile station MS and a prepaid card PC.

The Certificate authority server CA is a well-known server which issues an electronic authentication of standard X509-based on RSA public key encryption system, and is connected to the Internet INET. Concretely, the certificate authority server CA generates a public key certificate when a digital signature is given to guarantee correctness for a private key of each node in response to an issuing request of a public key certificate transmitted from each node on a network. As this digital signature is performed by a private signature key which the certificate authority server CA owns, each node which obtains a public key certificate decrypts this public key certificate by using the public key of the certificate authority server CA. As each node encrypts the data by a public key of the certificate authority server CA, and transmits it to the certificate authority server CA, the certificate authority server CA memorizes a private decryption key to decrypt this encrypted message.

The Directory server DS is a well-known server storing a public key certificate generated by the certificate authority server CA and CRL (Certificate Revocation List) for the public key certificate, and connected to the Internet INET. The directory server DS functions to search among public key certificates stored in the directory server DS a public key certificate requested by any of each nodes, and to distribute the same.

In this embodiment, a public key for mobile station MS and electronic bank server EBS receive an issue of public key certificate from the certificate authority server CA. Accordingly, a node which should be a communication partner for the mobile station MS and an electronic bank server EBS can confirm whether a third party pretends to be a communication partner or not by obtaining a public key certificate from the directory server DS, and verifying the digital signature.

The Registration authority server RA is a server provided on the Internet INET, and accepts an application of opening an electronic bank account by a user, and performs a process with regard to the opening of an electronic bank account by cooperating with the electronic bank server EBS, the certificate authority server CA and the directory server DS.

The registration authority server RA memorizes a private signature key and an encryption certificate for CA. A private signature key is a key which gives a digital signature to data which the registration authority server RA should transmit to outside nodes and this key prevents a third party from pretending to be the registration authority server RA. Also, an encryption certificate for CA is a certificate for a public key to encrypt data which should be transmitted to the certificate authority server CA. An encrypted message of an encryption certificate for CA is decrypted by a private decryption key which the certificate authority server CA owns. This key prevents a third party from intercepting the data and transmitting to the certificate authority server CA.

(2) Configuration of Electronic Bank Server EBS

Next, the electronic bank server EBS will be described with reference to the block diagram shown in FIG. 2.

Figure 2:
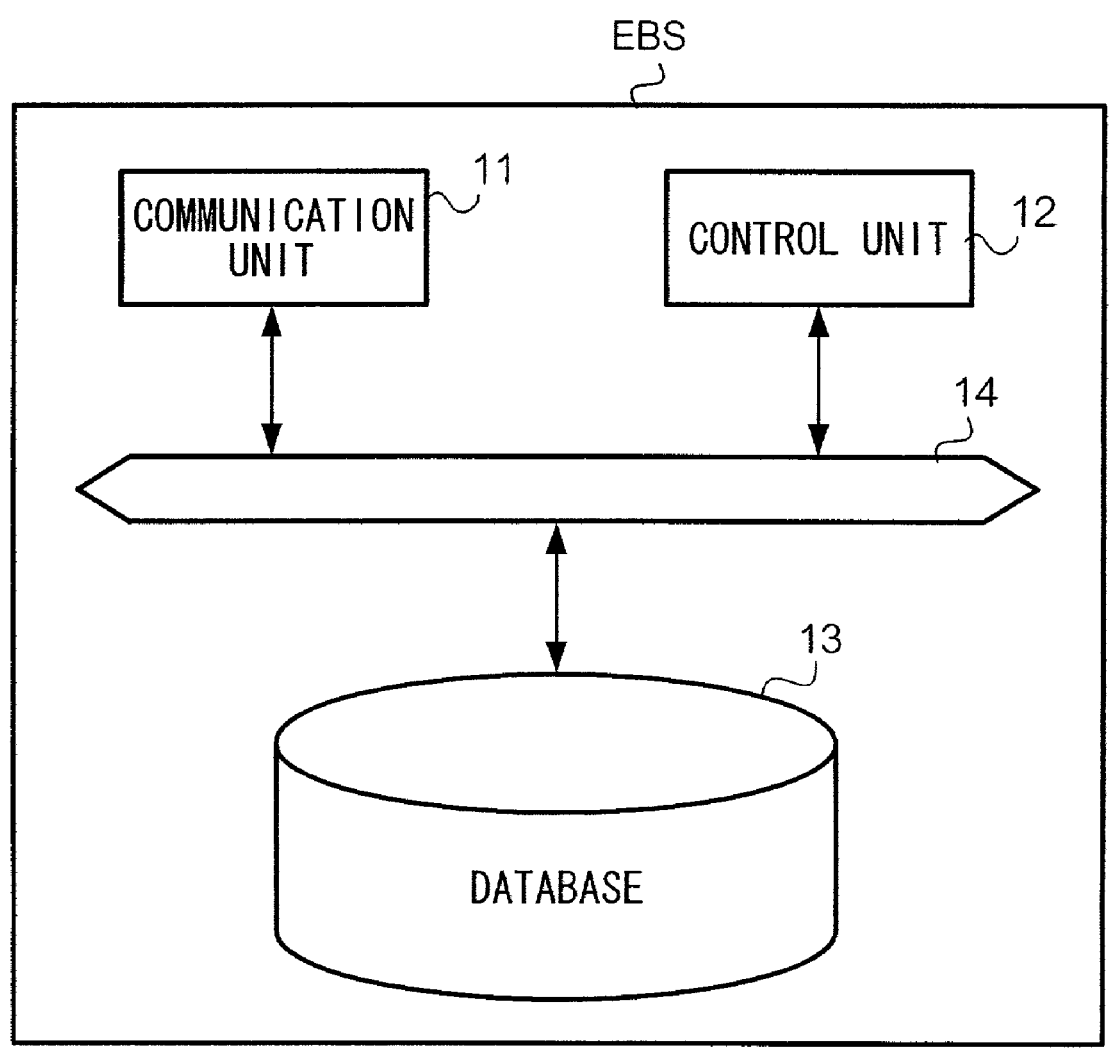
FIG. 2 is a block diagram illustrating the configuration of an electronic bank server according to the embodiment of the present invention.

As shown in FIG. 2, the electronic bank server EBS is configured by the communication unit 11, the control unit 12, the database 13, and bus 14 which connects these mutually.

The communication unit 11 comprises a connection interface with Internet INET (not shown here) and a communication control circuit (not shown here). This communication unit 31 performs data communication with the certificate authority server CA and the directory server DS via a mobile network MN and the internet INET, and with a mobile station MS via a mobile network MN.

The Control unit 12 is configured by the CPU (Central Process Unit) not shown here, ROM (Read Only Memory), RAM (Random Access Memory), and controls the overall electronic bank server EBS.

As shown in FIG. 3, a private signature key, a private decryption key, a CA signature verification certificate, and an electronic value information are memorized in Database 13.

A private signature key is a private key which gives a digital signature to data which is to be transmitted to the outside nodes from the electronic bank server EBS. A public key corresponding to this private signature key is registered in the directory server DS after a certificate is issued by the certificate authority server CA.

A private decryption key is a private key to decrypt an encrypted message received from an electronic bank server EBS. A public key corresponding to this private key is registered in the directory server DS after a certificate is issued by the certificate authority server CA.

A CA signature verification certificate is a certificate for a public key to verify a digital signature which the certificate authority server CA gives to various certificates with a private key. As this CA signature verification certificate is registered in the directory server DS, the electronic bank server EBS can obtain this certificate by accessing the directory server DS.

The Electronic value management information is information which manages electronic value information stored in a mobile station MS, and electronic value information stored in a prepaid card PC.

FIG. 4 is a diagram explaining the electronic value management information to manage electronic value information stored in UIM1 in the mobile station MS. As shown in this figure, the electronic value management information comprises electronic bank ID, electronic bank account number, electronic value amount in an electronic bank account, the electronic value amount in UIM, a time stamp at update of electronic value amount, current value amount in electronic bank account, current value amount in UIM, a time stamp at update of current electronic value amount, and electronic value update history.

The Electronic bank ID is identification information for an electronic bank server EBS which issued the electronic value.

The Electronic bank account number is the identification information to specify each electronic bank account.

The Electronic value amount in an electronic bank account is the balance information of the electronic value in an electronic bank account when a mobile station MS accesses an electronic bank server EBS at transaction end.

The Electronic value amount in UIM is the balance information of the electronic value in UIM1 when the mobile station MS accesses the electronic bank server EBS at transaction end.

A time stamp at the update of electronic value is information for showing date and time when the electronic value amount in UIM is updated, and issued by the electronic bank server EBS. An incorrect retransmission of electronic value will be discovered by using this time stamp as described later.

The current electronic value amount is the current balance information of electronic value in an electronic bank account.

The current electronic value in UIM is the balance information of electronic value which should be reflected on UIM1. As described later, when an exchange of electronic value is performed between the mobile stations MS without an electronic bank server EBS, a transaction log is notified to the electronic bank server EBS from either one of mobile stations MS after exchanging electronic value. When this notification is made, the electronic value amount which should be stored in both mobile stations MS is calculated. The Electronic value amount which should be reflected on UIM1 in the mobile station MS which does not communi-cate with the electronic bank server EBS corresponds to current electronic value amount in this UIM.

A time stamp at the update of current electronic value amount proves the date and time which the current electronic value amount in an electronic bank account and the current electronic value amount in UIM are updated. An incorrect retransmission of electronic value will be discovered by using this time stamp described later.

The Electronic value update history is an updated history of an electronic value amount in UIM at the point the mobile station MS last accesses the electronic bank server EBS.

Next, the electronic value management information to manage electronic value information stored in a prepaid card PC will be described with reference to FIG. 5. The different points of electronic value information between FIG. 4 and FIG. 5 are that prepaid card PC is the object as an electronic purse instead of UIM1, and the prepaid card ID is used instead of an electronic bank account number. Thus, the electronic value management information of UIM1 and a prepaid card PC in an electronic bank server EBS is different. The UIM1 corresponds to a fixed, one-to-one electronic bank account and a prepaid card on the contrary is transferable, and therefore manages an electronic value by using prepaid card IDs, and not by a prepaid card PC corresponding to an electronic bank account.

(3) Configuration of Mobile Station MS

Figure 6:
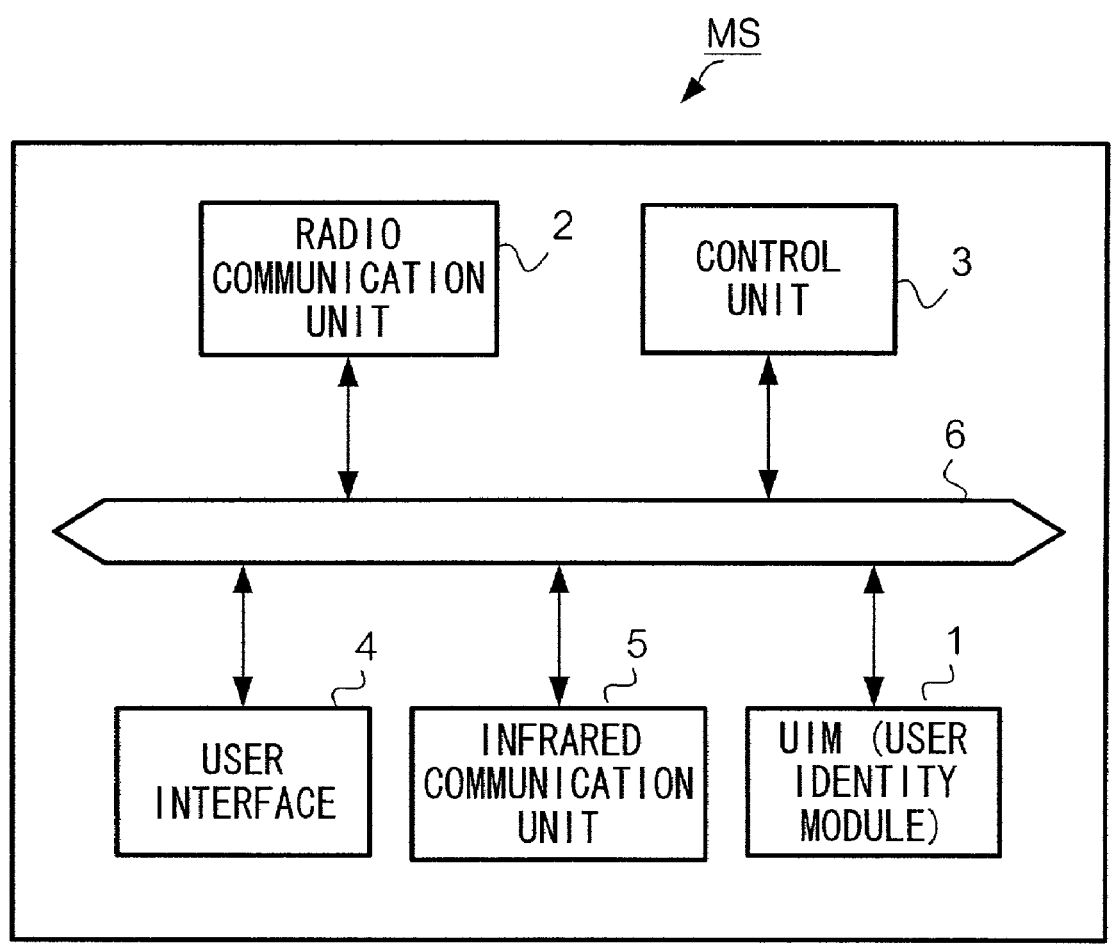
FIG. 6 is a block diagram illustrating the configuration of a mobile station according to the embodiment of the present invention.

Next, the configuration of mobile station MS will be described with reference to FIG. 6.

As shown in this figure, the mobile station MS is configured by radio communication unit 2, control unit 3, user interface 4, UIM1, infrared communication unit 5; and bus 6. Bus 6 connects these mutually.

Radio communication unit 2 comprising an antenna (not shown here) and a communication control circuit, performs radio communication with the mobile base station MBS in the mobile network MN. Also, the infrared communication unit 5 performs infrared communication with the prepaid card PC.

The control unit 3 is configured by CPU, ROM and RAM (not shown here), and controls overall the mobile station MS. The mobile station MS has a function which performs sound communication and data communication; and processes electronic value. A user can change these functions depending on the purpose. The control unit 3 controls each part of the mobile station MS. With regard to the electronic value process, control unit 3 performs a process of electronic authentication, through encryption and decryption, which also involves generating and verifying a time stamp and managing a private key and a public key certificate.

User interface 4 comprises a crystal panel to display various information, a keypad for a user to perform an input operation, and a microphone and a speaker for a user to make a call.

With reference to FIG. 7, the data to be memorized in UIM1 will be described. As shown in this figure, a private signature key, a private decryption key, an EB signature verification certificate, an encryption certificate for EB, a CA signature verification certificate, a user ID, and an electronic value information are memorized in UIM1.

The Private signature key is a private key which provides a digital signature to data which the mobile station MS transmits to outside nodes. By providing the digital signature to the data transmitted to the outside nodes, a third party is prevented from posing to be a user of the mobile station MS The Private decryption key is a private key which decrypts an encrypted message received by the mobile station MS. Thus, preventing a third party from intercepting a message at the time when the encrypted message is transmitted to the mobile station MS.

The EB signature verification certificate is a certificate for a public key to verify a digital signature which is signed by the electronic bank server EBS. Since the electronic bank server EBS provides the digital signature to the data for the mobile station MS, a third party is prevented from posing to be the electronic bank server EBS.

The Encryption certificate for EB is a certificate for a public key to encrypt data transmitted to the electronic bank server EBS. That is to say, intercepting by a third party is prevented as the data to be transmitted to the electronic bank server EBS is encrypted.

The CA signature verification certificate is a certificate for a public key to verify a digital signature which the certificate authority server CA gives to various certificates. Thus, reliability of a certificate issued by certificate authority server CA is guaranteed.

The User ID is identification information which specifies a user of the mobile station MS.

Next, as shown in FIG. 8, the electronic value information comprises an electronic bank ID; an electronic purse type; an electronic bank account number, an electronic bank signature SGN1, an electronic value amount in the electronic bank account, an electronic value amount in the UIM; a time stamp at update of the electronic value amount, an electronic bank signature SGN2, the current electronic value amount; and an electronic value update history.

The Electronic bank ID is described above.

The Electronic purse type is information which shows whether an electronic purse for storing electronic value information is UIM1 or a prepaid card PC.

The Electronic bank account number is described above.

The Electronic bank signature SGN1 is a digital signature given by the electronic bank server EBS to guarantee that the electronic bank ID, the electronic purse type, and the electronic bank account number described above are not manipulated.

The Electronic value amount in the electronic bank account is the balance information of the electronic value in the electronic bank account when the mobile station MS accesses electronic bank server EBS at transaction end.

The Electronic value amount in the UIM is the balance information of the electronic value in the UIM1 when the mobile station MS accesses electronic bank server EBS at transaction end.

A time stamp at the update of the electronic value amount shows the date and time of the update of the electronic value amount in the UIM, and this is issued by electronic bank server EBS.

The Electronic bank signature SGN2 is a digital signature given by the electronic bank server EBS to guarantee that the electronic bank ID, the electronic purse type, the electronic bank account number, the electronic value amount in the electronic bank account, the electronic value amount in the UIM, and a time stamp at update of electronic value amount described above are not manipulated.

The Current electronic value amount is the balance information of the electronic value which the UIM1 memorizes at the time of the current transaction.

The Electronic value update history is an updated history of the electronic value in the UIM from the point when mobile station MS last accesses electronic bank server EBS.

FIG. 9 is a diagram showing the detailed contents of the electronic value update history.

As shown in this figure, the electronic value update history comprises the recipient electronic bank account number, the payer electronic bank account number, the payer prepaid card ID, the transacted value amount, and the digital signature of a transaction partner.

A recipient electronic bank account number is an electronic bank account number of a user who receives electronic value in transaction. A payer electronic bank account number is an electronic bank account number of the user who pays electronic value in transaction.

Also, when a user of electronic money is a prepaid card PC, a payer prepaid card ID is registered as an updated history.

A Transacted value amount is the electronic value amount to be transacted; and a digital signature of a transaction partner is a digital signature which the mobile station MS gives to guarantee that the recipient electronic bank account number, the payer electronic bank account number, the payer prepaid card ID, and the transacted value amount are not manipulated.

The Mobile station MS transmits electronic value update history, as described above, to the electronic bank server EBS after transactions.

(3) Configuration of Prepaid Card PC

Next, the data to be stored in a prepaid card PC will be described. FIG. 10 is a diagram which shows the data that is to be stored in a prepaid card PC. As shown in this figure, the EB signature verification certificate, the encryption certificate for EB, the CA signature verification certificate, and the electronic value information are memorized in a prepaid card PC. The EB signature verification certificate, the encryption certificate for EB, and the CA signature verification certificate are common information which the UIM1 memorizes, so the explanations will be omitted.

Also, a private signature key and a private decryption key are memorized in the UIM1, but not in a prepaid card PC. Unlike the mobile station MS, a user who owns a prepaid card PC is officially authorized as the proper owner. Because a prepaid card is transferable, a digital signature to prevent a third party from pretending to be the owner is not required to be performed, or the data for electronic value information transmitted to the prepaid card PC is not required to be transmitted as an encrypted one.

Next, the electronic value information in a prepaid card PC will be described with reference to FIG. 11. As shown in this figure, the electronic value information comprises the electronic bank ID, the electronic purse type, the prepaid card ID, the electronic bank signature SGN3, the electronic value amount in a prepaid card, a time stamp at update of electronic value amount, the electronic bank signature SGN4, the current electronic value amount and the electronic value update history.

The electronic value information in the prepaid card is different from the one in the UIM1 as follows;

the electronic value in the prepaid card PC is used as the object instead of the electronic value in UIM1; and the electronic value amount in an electronic bank account is not memorized in this prepaid card.

That is to say, a prepaid card PC does not correspond to the electronic bank account of a user in a fixed way as it is transferable among users. Accordingly, a prepaid card PC does not memorize an electronic value amount in the electronic bank account.

Also, the electronic value update history shown in FIG. 11 is common information to electronic value update history in UIM1 shown in FIG. 9 except that the electronic value information is recorded in the prepaid card and not in the UIM, so explanation thereof will be omitted.

B: Operation

Next, the operation of the embodiment comprising the above configurations will be described.

(1) Opening of a electronic bank account, (2) Continuation of the electronic bank account, (3) Deposit and withdrawal of an electronic value, (4) Exchange between electronic purses, and (5) Transfer of the electronic value will be described as below.

(1) Opening of Electronic Bank Account

Figure 12:
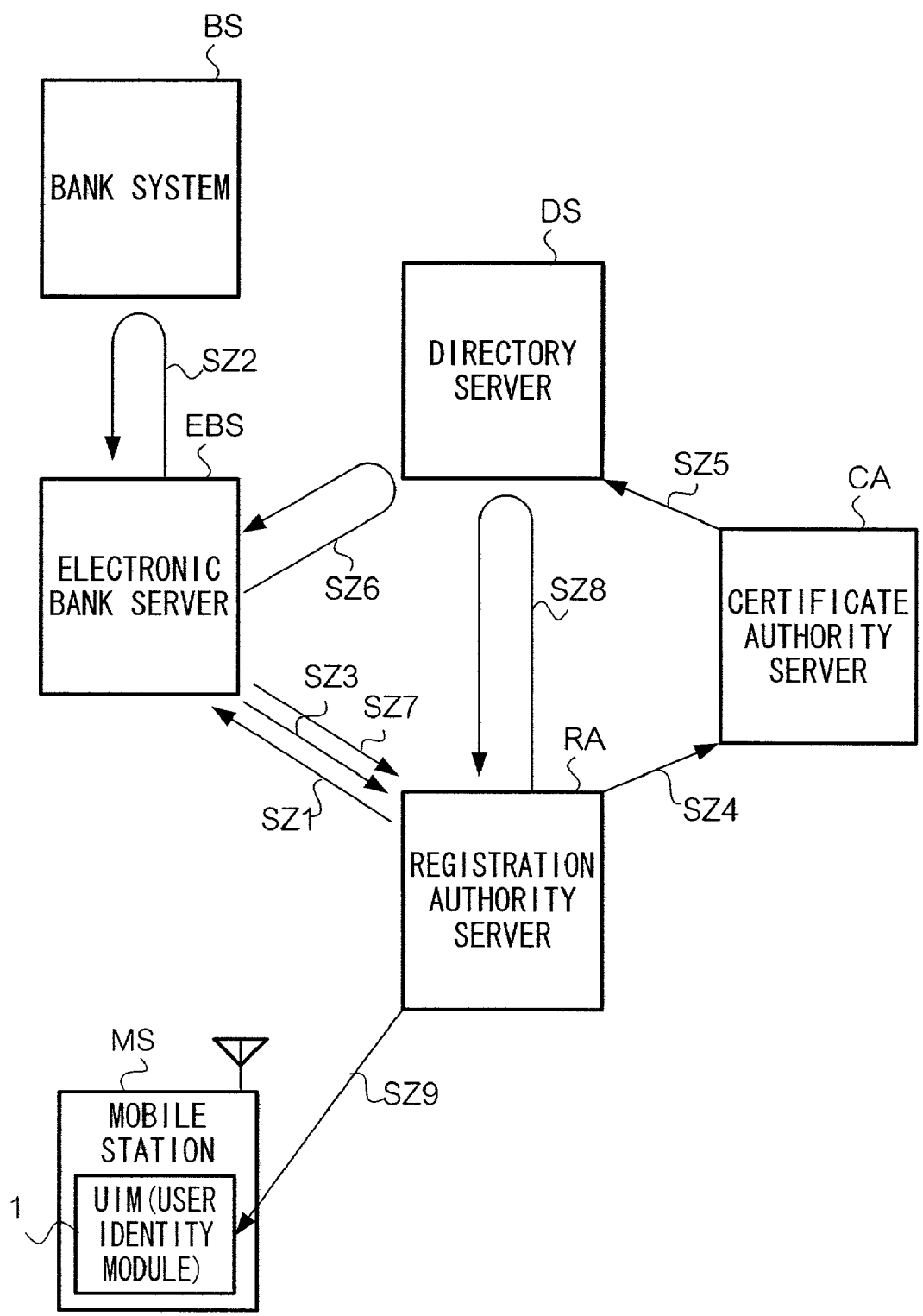
FIG. 12 is a block diagram explaining the operation of opening an electronic bank account.

FIG. 12 is a sequence diagram showing an operation of the overall system when an electronic bank account is opened.

At first, a user goes to the registration authority (not shown here) where the registration authority server RA is installed, and notifies necessary information to open an electronic bank account, such as a name, address, password and telephone number for the mobile station MS, and bank account number for the bank account which deposits electronic value to an operator. The operator inputs such information into the registration authority server RA.

The Registration authority server RA transmits the input information to the electronic bank server EBS, and requests the electronic bank server EBS to open an electronic bank account. (Step SZ1)

The Electronic bank server EBS inquires of the bank system BS whether a user has a bank account or the ability to pay, and opens a temporary electronic bank account when the above things are confirmed. (Step SZ2) At this moment, an electronic bank account number is issued, and the expiry date is set for the electronic bank account.

Next, the electronic bank server EBS transmits the electronic bank account number and expiry date for an electronic bank account to the registration authority server RA. (Step SZ3)

When the registration authority server RA receives the electronic bank account number and the expiry date for the electronic bank account, a pair key (That is to say, a pair of a private key and a public key) corresponding to a user is generated accordingly. This pair key consists of 2 types; a pair key for digital signature and verification of data which should be transmitted to the electronic bank server EBS from the mobile station MS and; a pair key for encryption and decryption of data which should be transmitted to the mobile station MS from the electronic bank server EBS. The expiry date for this pair key is the same as the one for the electronic bank account numbers.

The registration authority server RA transmits a public key to verify a digital signature, and a public key to encrypt a digital signature among generated pair keys with electronic bank account numbers to the certification authority server CA, and requests the certification authority server CA to issue public key certificates with regard to these pair keys. (Step SZ4)

Accordingly, the certification authority server CA issues public key certificates for digital signature verification and encryption, and registers these certificates with the directory server DS by correlating with the electronic bank account numbers. (Step SZ5)

On the other hand, the electronic bank server EBS accesses the Directory server DS, and confirms that public key certificates for digital signature verification and encryption are registered by searching, as a clue, an electronic bank account. (Step SZ6) At this moment, a communication which security is guaranteed between electronic bank server EBS and mobile station MS is prepared to carry out.

And, the electronic bank server EBS specifies an electronic bank account number, and notifies the registration authority server RA that the electronic bank account shown by the above specified number is opened. (Step SZ7)

Accordingly, the registration authority server RA accesses directory server DS, and obtains the EB signature verification certificate, the encryption certificate for EB, and the CA signature verification certificate stored beforehand. (Step SZ8)

And, the registration authority server RA writes a private signature key, a private decryption key, the EB signature verification certificate, the encryption certificate for EB, the CA signature verification certificate, the electronic bank ID, and the electronic bank account number in the UIM1 via the ROM writer (not shown here). A user receives data written by the UIM1, and attaches this to the mobile station MS. And, the process is completed. (Step SZ9)

(2) Continuation of the Electronic Bank Account

A user can perform a continuous use of the electronic bank account opened as described above by paying the account management charge regularly. A payment method for this account management charge is as follows:

(A1) The Electronic bank withdraws electronic value corresponding to the account management charge from the electronic bank account of a user.

(B1) The Electronic bank withdraws money corresponding to the account management charge from an actual bank account of a user.

(C1) The Electronic bank appropriates a part of the money collected from a user as repurchase price for UIM1, as an account management charge.

(D1) The Electronic bank appropriates a part of the money collected from a user as an installation cost of a new key for the UIM1, as account management charge.

(E1) A part of the cost of issuing a public key certificate of a pair key regenerated in the UIM1 by the electronic bank is appropriated as account management charge.

As described above, the key for the UIM1 is updated regularly. The reason is that setting the expiry date to a key and updating the information regularly are general rules which provide security to a system which uses a key based on a public key encryption algorism.

This concrete method is as follows:

(A2) A user repurchases the UIM1 where a new key is installed.

(B2) The Registration authority server RA rewrites data for a new key into the UIM1.

(C2) A user transmits a new key to the UIM1 in the mobile station MS from the Registration authority server RA.

(D2) A user regenerates a new key in the UIM1, and requests the registration authority server RA to issue a public key certificate.

Figure 13:
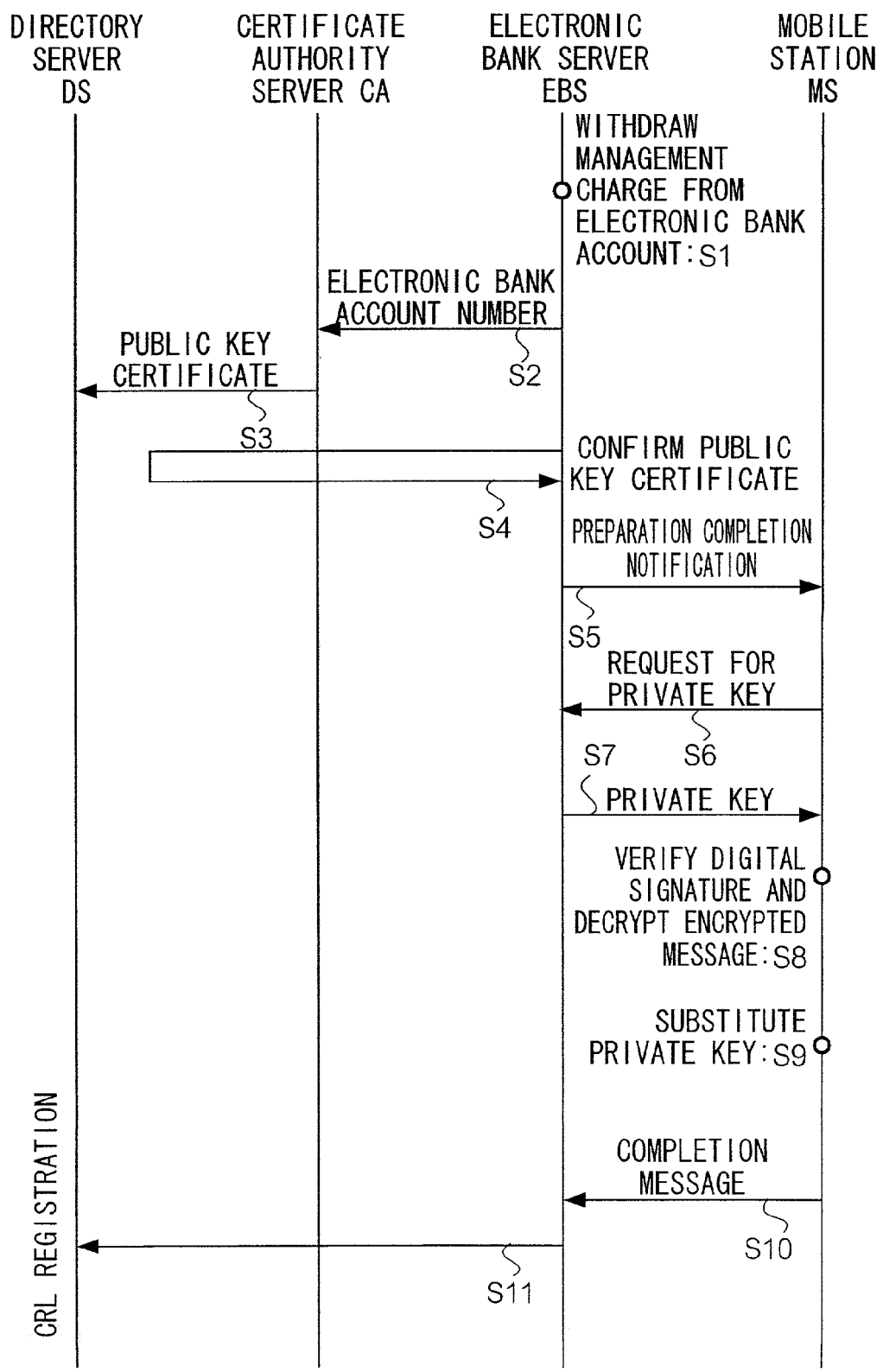
FIG. 13 is a sequence diagram illustrating the operation of the overall system according to the embodiment of the present invention.

An example of updating the UIM1 will be described with reference to the sequence shown in FIG. 13. The example given below describes, the two payment methods which can be selected as an option. In the first option, the electronic value corresponding to the account management charge is withdrawn and paid into the electronic bank server EBS (described above A1); and in the second option a private key among the pair keys which the certificate authority server CA generates is transmitted to the mobile station MS. (described above C2)

And, the withdrawal date and amount of money for the account management charge is notified beforehand by the Electronic bank server EBS to the user who requests the continuation of the use of the electronic bank account. When the date for withdrawal comes, the electronic bank server EBS withdraws the electronic value from the electronic bank account of a user as account management charge for the next period. (Step S1)

Next, the electronic bank server EBS encrypts an electronic bank account number of a user to which a digital signature is given, and notifies the encrypted account number to the certificate authority server CA, and requests the CA to reissue a pair key, for a permission to transmit a private key for users, and to issue a public key certificate. (Step S2)

On the other hand, the certificate authority server CA decrypts and verifies the digital signature, and generates a pair key, and issues a public key certificate for the generated pair key after confirming that the above requests come from the proper electronic bank server EBS. The public key certificate issued is then registered with the directory server DS. (Step S3)

When the electronic bank server EBS accesses the directory server DS, and confirms that a new certificate has been issued (Step S4), the electronic bank server EBS notifies the mobile station MS of a user who performs continuous use, that the account management charge is received and a preparation to transmit a private key is ready to be carried out. (Step S5)

When the mobile station MS receives a notification from the electronic bank server EBS, that a private key is ready to be transmitted, the mobile station MS requests the certificate authority server CA to transmit a new private key in response to the operation by a user after this notification has been displayed. (Step S6)

The Certificate authority server CA encrypts a new private key with an old encryption public key of a user (valid at present), and transmits this key which has a digital signature, to the mobile station MS when receiving a request to transmit a new private key from the mobile station MS. (Step S7)

The Mobile station MS verifies the digital signature given to the new private key transmitted from the certificate authority server CA, and confirms that this signature is transmitted from the proper certificate authority server CA. Also, the MS decrypts the private key transmitted from the certificate authority server CA by using a valid private decryption key at present. (Step S8)

Next, the mobile station MS substitutes the old private key in the UIM1 with the new one. (Step S9) Then, the mobile station MS transmits, to the certificate authority server CA, this message signed with the new private signature key, showing that substitution has been successfully carried out. (Step S10)

The certificate authority server CA in return, registers a public key for an old private key with a CRL in the directory server DS after receiving a message that the substitution has been successfully carried out. (Step S11)

Therefore, it is impossible to use a public key for an old private key.

(3) Deposit and Withdrawal of Electronic Value

Figure 14:
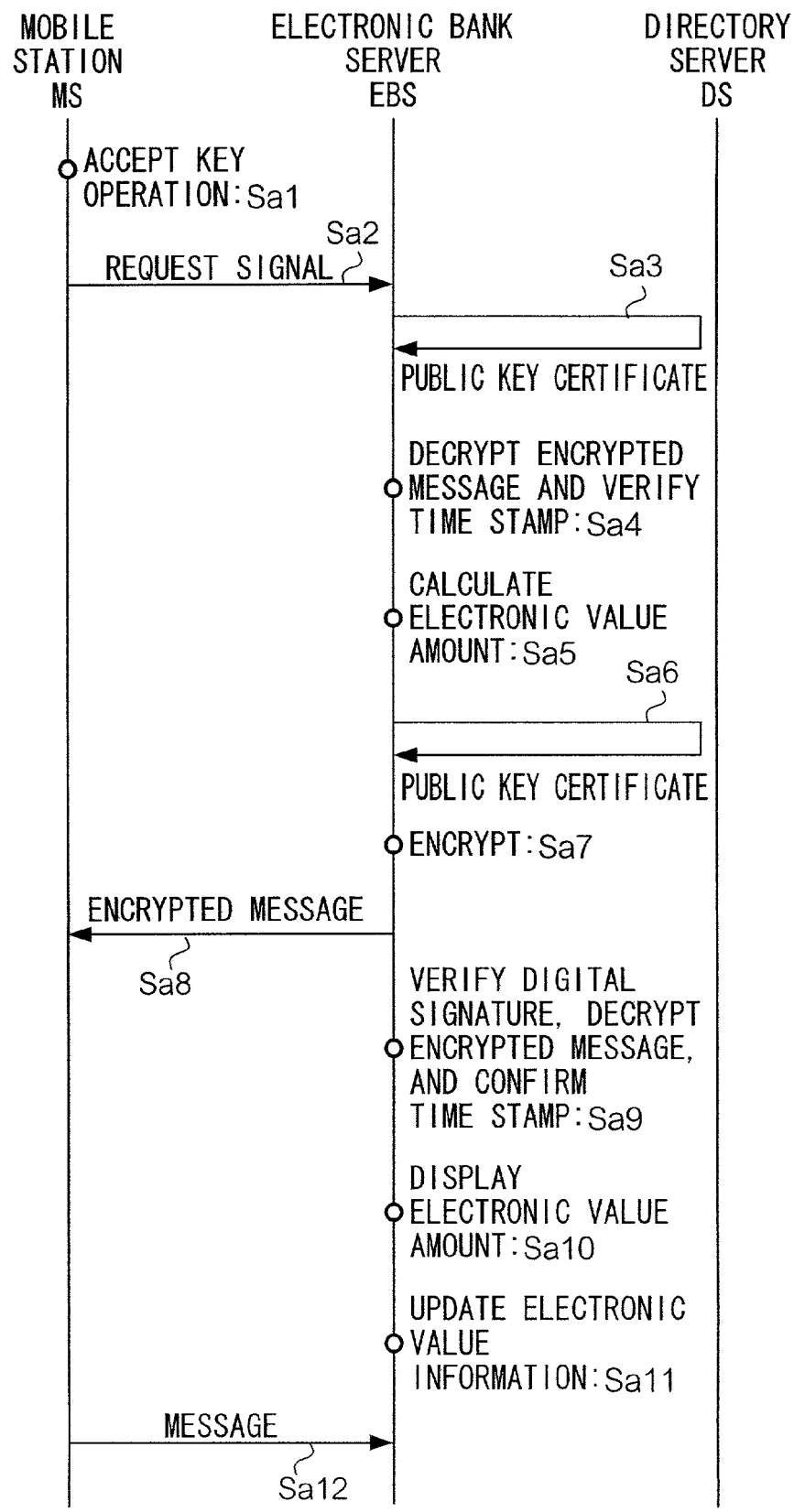
FIG. 14 is a sequence diagram illustrating the operation of the overall system according to the embodiment of the present invention.

Next, the operation of deposit and withdrawal of electronic value to a prepaid card PC will be described with reference to the sequence shown in FIG. 14 and FIG. 15 where 100 yen of electronic value amount is withdrawn from a deposit of 1,000 yen in an electronic bank account and appropriated to the UIM1.

At first, the user operates a keypad for the mobile station MS, having selected to use either the electronic value in a prepaid card PC or the one in the UIM1 installed in the mobile station MS, and inputs the electronic value amount to be withdrawn from the electronic bank account or the one to be deposited into the electronic bank account. The UIM1 is selected as an electronic purse, and the withdrawn 100 yen is input by the user in this case. The mobile station MS accepts the key operation described above. (Step Sa1)

Next, after the mobile station MS encrypts the information input carried out in Step Sa1 and the electronic value information in UIM1 with the encryption certificate for the EB stored in the UIM1, the mobile station MS gives a digital signature to the above information with a private signature key, to which a time stamp is given and transmits it to the electronic bank server EBS as a request signal. (Step Sa2)

The electronic bank server EBS obtains a public key certificate for verification of the digital signature from the directory server DS by referring to the electronic bank account number included in the received electronic value information. and verifies the correctness of the digital signature in the mobile station MS by using this certificate when receiving the above information. (Step Sa3)

Next, the electronic bank server EBS decrypts an encrypted message received in Step Sa2 by using a private decryption key which the electronic bank server EBS memorizes, and confirms the time stamp. (Step Sa4)

To avoid receiving from the same user more than twice a request signal which has the same stamp, the stamp confirmation process is used.

In this way, improper retransmission of a request signal is prevented by this process.

Next, the electronic bank server EBS confirms the designated amount of money for withdrawal and deposit, and calculates the electronic value amount in the UIM and the electronic value amount in the electronic bank account after a withdrawal or a deposit. (Step Sa5) The electronic value amount in the UIM is 100 yen after the withdrawal, the electronic value amount in the electronic bank account is 900 yen in this case.

Next, the electronic bank server EBS obtains a public key certificate for encryption from the directory server DS by using the electronic bank account number as a clue. (Step Sa6)

And, the electronic bank server EBS encrypts the calculated amount in Step Sa5, the electronic bank account number, the user name, and a transaction type showing the withdrawal and deposit, and the transacted value amount with a public key certificate obtained from the directory server DS. (Step Sa7)

Further, the electronic bank server EBS gives a digital signature to the above encrypted message with a private signature key which the electronic bank server EBS memorizes, and transmits this encrypted message to which a time stamp is given to the mobile station MS. (Step Sa8)

The mobile station MS confirms verification of the digital signature, encryption of the encrypted message, and a time stamp for the received data. (Step Sa9)

The mobile station MS displays the electronic value amount in the UIM and the electronic value amount in the electronic bank account after the withdrawal and deposit. (Step Sa10) In this case, the electronic value amount in the UIM is 100 yen, and the electronic value amount in the electronic bank account is 900 yen. The user checks this amount carefully, and performs a key operation to decide OK or NG whether the request is the same as the one of the user or not.

When the OK key operation is performed, the mobile station MS updates the electronic value information memorized in the UIM1. (Step Sa11)

That is to say, the mobile station MS updates the electronic value amount in the electronic bank shown in FIG. 8 from 1,000 yen to 900 yen and the electronic value amount in the UIM1 shown in FIG. 8 from 0 yen to 100 yen, and stores the received time stamp as a time stamp at update of the electronic value amount and a digital signature as an electronic bank signature SGN2.

And, the mobile station MS generates a message that the OK key operation is performed, and performs a process of encryption with the encryption certificate for the EB, of a digital signature with a private signature key, and gives a time stamp for this message which is the same as Step Sa2, and transmits it to electronic bank server EBS. (Step Sa12)

Figure 15:
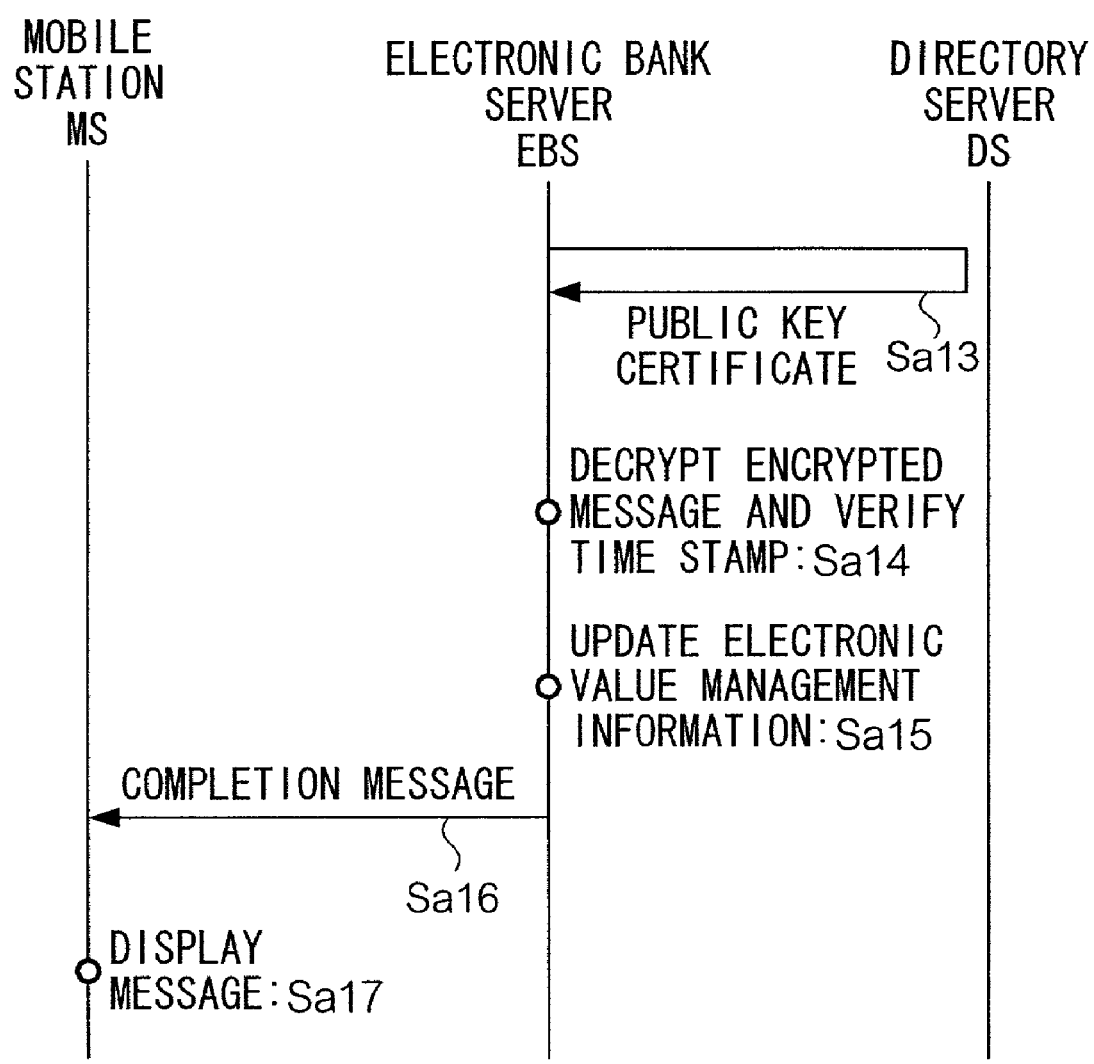
FIG. 15 is a sequence diagram illustrating the operation of the overall system according to the embodiment of the present invention.

Next, the electronic bank server EBS obtains a digital signature verification certificate from the directory server DS as in Step Sa3, and verifies the correctness of the digital signature by using this certificate when receiving the above message as described in FIG. 15 (Step Sa13).

Further, the electronic bank server EBS decrypts an encrypted message by using a private decryption key as in Step Sa4, and confirms the time stamp. (Step Sa14)

As a result, the electronic bank server EBS updates the electronic value management information shown in FIG. 4 when confirming an OK message. (Step Sa15)

The electronic value amount in the electronic bank account is updated from 1,000 yen to 900 yen, the electronic value amount in the UIM is updated from 0 yen to 100 yen, the current electronic value amount in the electronic bank account is updated from 1,000 yen to 900 yen, and the current electronic value amount in the UIM is updated from 0 yen to 100 yen. A time stamp is issued at this moment and this time stamp is stored in the electronic bank server EBS as the time stamp at update of electronic value amount and a time stamp at update of current electronic value amount.

The electronic bank server EBS transmits a message to the mobile station MS that the transaction has been completed (Step Sa16); and in return, the mobile station MS displays the above received message (Step Sa17), and the process is completed.

In the above case, when a key operation in Step Sa10 is NG, mobile station MS does not update electronic value information in UIM1. And, a NG message is generated in Step Sa12, and it is transmitted to electronic bank server EBS.

Also, the electronic bank server EBS completes a process without updating the electronic value information in Step Sa13 when receiving an NG message. But, the electronic bank server EBS stores a log about the above process with a digital signature of the mobile station MS to deal with claims, which an OK message has been input to confirm the result and so forth, from a user of the mobile station MS.

For example, when the above transaction cannot be completed for reasons such as the electronic bank server EBS not receiving a message from the mobile station MS as in Step Sa12, the electronic bank server EBS generates a non-completion message of a transaction not performed, and encrypts this message and the electronic value amount in the UIM1 to which a digital signature and time stamp are given before the transaction, and transmits this message and value amount to the mobile station MS.

On the other hand, the mobile station MS displays this message when receiving a non-completion message from the electronic bank server EBS, and the mobile station MS will substitute the electronic value amount in the UIM with the one in the UIM transmitted with non-completion message before transaction.

Also, for example, when the mobile station MS cannot receive either the completion or the non-completion message for reasons such as a prolonged communication interception, the mobile station MS displays a message of transaction not completed on display. A user operates the mobile station MS to perform a communicative connection to the electronic bank server EBS after restoration of the communication interception, and obtains an updated electronic value information, and updates the electronic value information of a user.

In the above example, the electronic value in the UIM1 of the mobile station MS was described. A prepaid card PC only has to go through the same process as described above via the mobile station MS by an infrared communication means when the electronic value in the prepaid card PC is deposited in the electronic bank account.

(4) Exchange Between Electronic Purses

The Mobile station MS can exchange electronic value by a local communication means which the electronic bank server EBS does not mediate like an infrared communication means.

With reference to the sequence shown in FIG. 16 and FIG. 17, the case in which the electronic value of 100 yen is paid from the mobile station MS1 of user A, and the mobile station MS2 of user B receives this 100 yen value will be described below.

At first, the mobile station MS1 transmits by infrared communication, a request signal to mobile station MS2 of user B for information on the electronic bank ID in the electronic value information of user B, the electronic purse type, the electronic bank account number, and the EB signature SGN1. (Step Sb1)

The mobile station MS2 of user B reads out electronic value information requested from its own UIM1, and transmits this information to mobile station MS1 by infrared communication on receiving this request signal. (Step Sb2)

The mobile station MS1 verifies EB signature SGN1 in the received electronic value information, and confirms that the user B is the proper owner of the electronic value which the electronic bank server EBS issues. (Step Sb3) If the EB signature SGN1 is not confirmed, the process is stopped.

If confirmation is given, user A performs a key operation to request payment after inputting the electronic value amount of 100 yen to be paid to user B, and electronic purse type information (hereafter referred to as UIM1). The key operation is then accepted by mobile station MS1. (Step Sb4)

Next, the mobile station MS1 organizes an electronic bank account of user B, the electronic bank number of user A, and the transacted value amount (in this case, the electronic value amount 100 yen paid from the mobile station MS1 to mobile station MS2) as information set, and gives a digital signature of user A to this information set, and transmits it to mobile station MS2 as electronic value information which user A pays. In this case, the mobile station MS1 transmits the electronic bank ID, the electronic purse type, the electronic bank account of user A, and the EB signature SGN1 in the electronic value information which the mobile station MS1 memorizes. (Step Sb5)

The Mobile station MS2 verifies the EB signature SGN1 given to the received information set, and confirms that user A is the true owner of the electronic value which the electronic bank server EBS issues. (Step Sb6) If it is not confirmed that user A is the true owner, the transaction of the process is stopped.

Further, the mobile station MS2 verifies the digital signature of user A given to the received information set. (Step Sb7) This prevents a third party from posing as user A of the mobile station MS1.

Next, the mobile station MS2 displays the electronic value information which user A pays except for a digital signature information of user A. (Step Sb8) That is to say, the electronic bank account number of user B, the electronic bank account number of user A, and the transacted value amount of 100 yen are displayed.

User B refers to this display, and inputs an OK message into the mobile station MS2 if user B decides that there are not any problems.

On the other hand, if user B encounters problems, user B inputs an NG message into the mobile station MS2. The mobile station MS2 notifies this message to mobile station MS1, and the process will be stopped.

Next, the mobile station MS2 adds the electronic value amount of 100 yen corresponding to the transacted value amount to the UIM current electronic value amount in the electronic value information memorized in its own UIM 1, and adds to electronic value update history, an update history based on the electronic value information paid by user A which is received from the mobile station MS1 (Step Sb9)

Next, the mobile station MS2 gives a digital signature of user B to the electronic bank account number of user B, electronic bank account number of user A, and the transacted value amount of 100 yen except for a digital signature of user A in the electronic value information which user A pays, and transmits the information to the mobile station MS1 as the information which user B received. (Step Sb10)

The mobile station MS1 receives the electronic value information which user B received, and verifies the digital signature of user B which is transmitted along with the information. (Step Sb11)

Next, the mobile station MS1 deducts the electronic value information 100 yen corresponding to the transacted value amount from the current electronic value amount in the UIM, and adds an updated history to the electronic update history, updates the electronic history based on the electronic value information received by user B. (Step Sb12)

At this moment, the local electronic value exchange between mobile station MS1 and mobile station MS2 will be completed.

Figure 16:
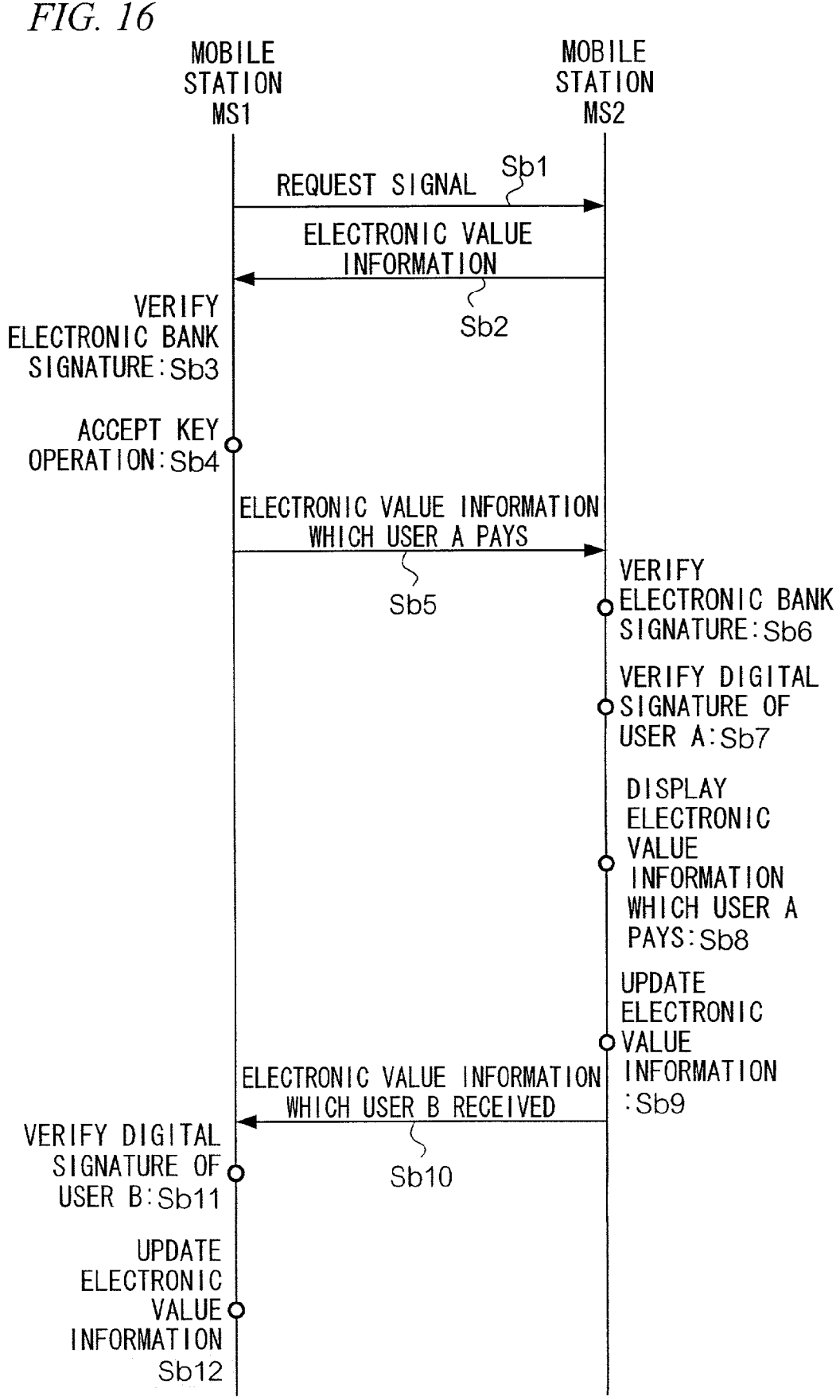
FIG. 16 is a sequence diagram illustrating the operation of the overall system according to the embodiment of the present invention.
Figure 17:
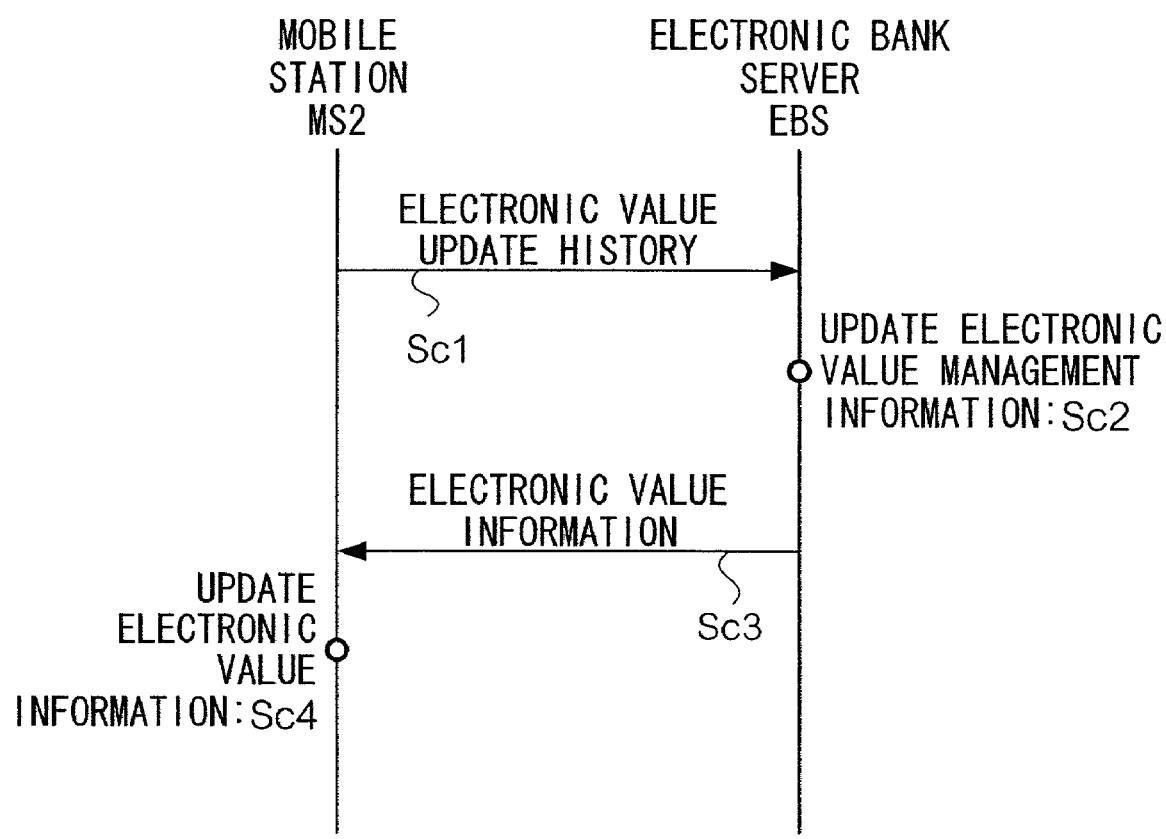
FIG. 17 is a sequence diagram illustrating the operation of the overall system according to the embodiment of the present invention.

Next, the sequence shown in FIG. 17 is performed when the mobile station MS2 of user B needs to communicate with the electronic bank server EBS after completing the process shown in FIG. 16.

At first, the mobile station MS2 reads out the updated electronic value (update) history from its own UIM1, transmits this history to the electronic bank server EBS, and requests the electronic bank server EBS to confirm the correctness of the transaction. (Step Sc1)

On the other hand, the electronic bank server EBS refers to the electronic value update history received from mobile station MS2, and verifies a transaction partner digital signature, which is the digital signature of user A in this case, in this electronic value update history. The electronic bank server EBS changes the electronic value information described below if no problems are found through this verification. (Step Sc2)

That is to say, with regard to the electronic value management information corresponding to user B who receives the electronic value, the electronic bank server EBS performs an updating process to add 100 yen to the electronic value amount in the UIM, to update the time stamp at update of the electronic value amount, to add 100 yen to the current electronic value amount in the UIM, and to update a time stamp at the update of the current electronic value amount.

Also, with regard to the electronic value management information corresponding to user A who pays the electronic value, the electronic bank server EBS reduces the current electronic value amount in the UIM by 100 yen, and performs a process to update the time stamp at update of the current electronic value amount.

And, if there are some problems in the verification result of the transaction partner digital signature, the electronic bank server EBS generates a message that updating has not been processed due to problems, and notifies the manager of the electronic bank server EBS.

The electronic bank server EBS transmits the electronic value information which should be updated based on the electronic value management information updated in Step Sc2 to mobile station MS2. (Step Sc3) Electronic value information transmitted in this case is the electronic value amount in the UIM, with a time stamp at update of the electronic value amount, and the electronic bank signature SGN2.

If there are some problems in the verification result of the transaction partner digital signature, a message that updating has not been processed due to problems will be transmitted with the above information to mobile station MS2.

The mobile station MS2 updates the electronic value information in its own UIM1 in response to electronic value information received from the electronic bank server EBS. (Step Sc4)

And, the electronic value information of mobile station MS1 is confirmed by the electronic bank server EBS when the mobile station MS1 communicates with the electronic bank server EBS with regard to the process which will take place as in mobile station MS2.

That is to say, the electronic bank server EBS compares the current electronic value amount in the UIM with the electronic value amount in the UIM in the electronic value management information corresponding to user A when the electronic bank server EBS is accessed from the mobile station MS1. If both amounts are different, the electronic value information will be updated. The contents of update in this case are: matching the electronic value amount in the UIM with the current electronic value amount in the UIM, and updating the time stamp at update of the electronic value amount.

The electronic bank server EBS transmits electronic value information which should be updated, to the mobile station MS1 by matching the above updated information. That is to say, the electronic bank server EBS transmits the electronic value amount in the UIM, a time stamp at update of the electronic value amount, and the electronic bank signature SGN2.

The mobile station MS1 verifies the electronic bank signature SGN2 in the information received from the electronic bank server EBS, and updates the electronic value information in the UIM1 if no problems are found. (Step Sb20)

It follows that the transaction is guaranteed by the electronic bank server EBS, and the process will be completed.

An exchange between the electronic purses is only completed effectively when the electronic value update history arrives at the electronic bank server EBS from both purses of a transactor.

Also, process can be completed when an electronic purse update history is notified to either one of the electronic purses. In this case, when an updated history of paid electronic value is notified to the electronic bank server EBS, it can be considered that the process is completed.

In the above example, the UIM1 in the mobile station MS was described as a payer's an electronic purse, electronic value in prepaid card PC is also possible to use. In this case, the prepaid card PC only has to go through the same process as the above mentioned via the mobile station MS by infrared communication.

(5) Transfer of Electronic Value

The electronic value can be transferred to someone else as a form "transfer from your purse or your electronic bank account to the electronic bank account of someone else"

Figure 18:
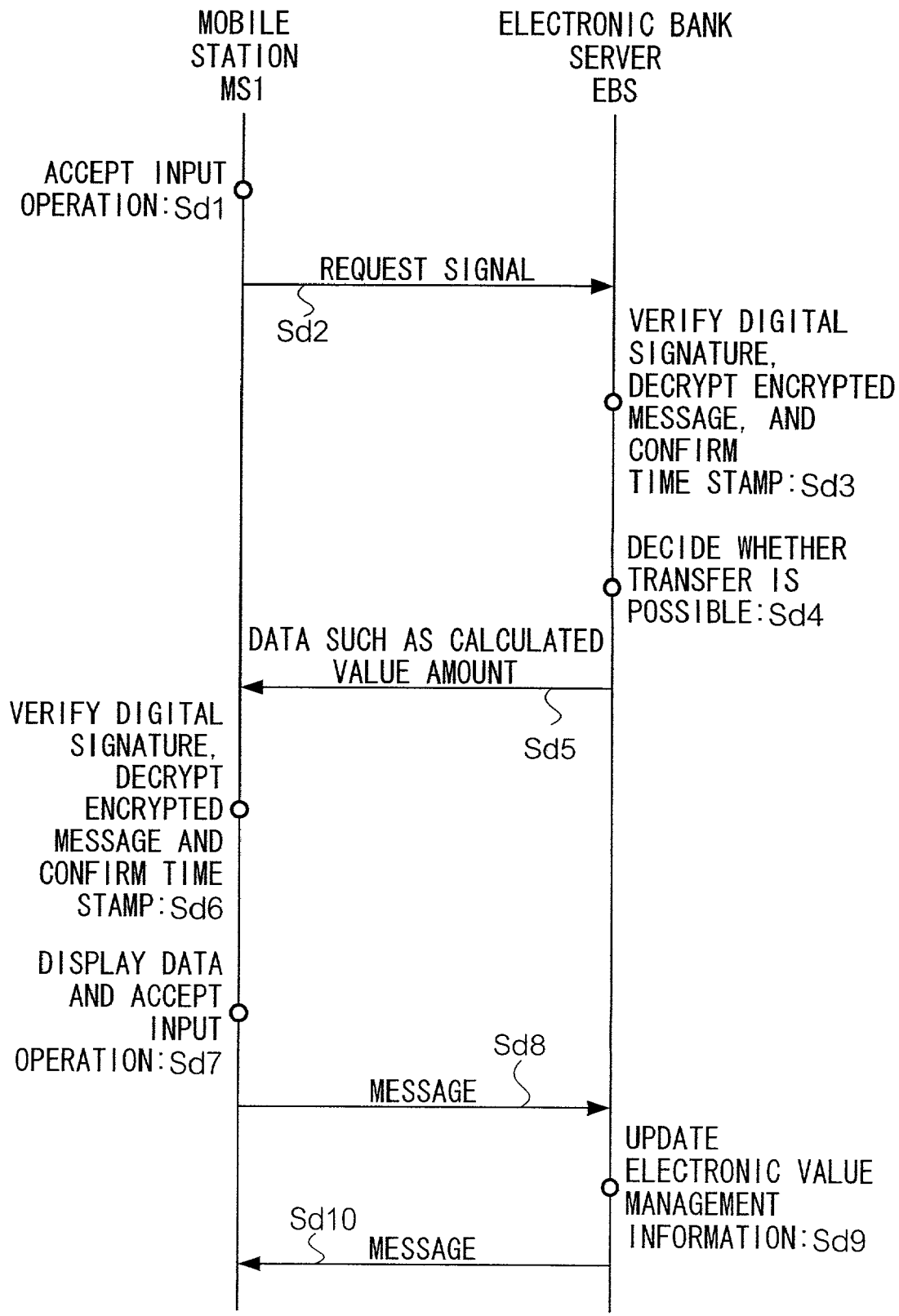
FIG. 18 is a sequence diagram illustrating the operation of the overall system according to the embodiment of the present invention.

The transfer of electronic value will be described with reference to the sequence shown in FIG. 18.

At first, the user operates the mobile station MS, and selects a withdrawal means to transfer the electronic value. (hereafter referred to as a transfer means) Concretely, either one of the prepaid card PC, the UIM1 in the mobile station MS, or the electronic bank account of a user is selected. It is assumed that the UIM1 is selected in this case. Next, the user inputs an electronic bank account number for a transfer point (hereafter referred to as electronic bank account number for a transfer point) and the amount to be transferred. (hereafter referred to as transfer money), Mobile station MS accepts the above operations. (Step Sd1)

Next, the mobile station MS gives a time stamp to the information which is input by the user, encrypts this information with a public encryption key for the electronic bank server EBS, and transmits the data to which a digital signature is given by using a private signature key to the electronic bank server EBS as a request signal to request a transfer. (Step Sd2)

When a user selects a prepaid card PC as a transfer means in Step Sd1, the mobile station MS performs communication through infrared means with the prepaid PC, and obtains electronic value information in the prepaid card PC, and transmits this information to the electronic bank server EBS.

On the other hand, the electronic bank server EBS verifies the digital signature on the received data, and decrypts the encrypted message, and confirms the correctness of the electronic value information by checking a time stamp. (Step Sd3)

Next, the electronic bank server EBS confirms:
1, existence of the electronic bank account to which the electronic value is transferred;
2, availability of the electronic bank account which is appointed to transfer the electronic value; and
3, the balance of the electronic value in a transfer means which transfers the electronic value is larger than the amount of the electronic value amount to be transferred. (Step Sd4)

When a prepaid card PC is selected as a transfer means, the electronic bank server EBS verifies the electronic bank signature SGN4, and confirms whether a transfer is possible or not after confirming that the electronic value information is not transcribed falsely.

Next, the electronic bank server EBS calculates the electronic value amount of a transfer means (UIM1 in this case) after transferring. And, the electronic bank server EBS gives a time stamp to the electronic bank ID, the electronic bank account number of a transfer point, the user name of the electronic bank account for a transfer point, the amount of transferred money, the electronic bank account number of a user of the transfer means, and the electronic value amount of a transfer means (UIM1) before or after transferring, and encrypts with a public encryption key obtained from the directory server DS, and gives a digital signature with a private signature key which the electronic bank server EBS memorizes, and transmits to the mobile station MS. (Step Sd5)

The mobile station MS confirms that there is no incorrectness by verifying the digital signature, decrypting an encrypted message, and confirming a time stamp of the received data. (Step Sd6)

Next, the mobile station MS displays the received data. When a user checks this data after reading, and performs a key operation showing OK or NG, the mobile station MS accepts this operation by the user. (Step Sd7)

When a key operation showing OK is performed, the mobile station MS updates the electronic value information memorized by the UIM1 selected as a transfer means, the electronic value information which should be updated in this case is the electronic value amount in the UIM, a time stamp at update of electronic value amount, the electronic bank signature SGN2, and the current electronic value amount. The information in the electronic purse is not updated when an electronic bank account is selected as a transfer means.

Also, a key operation for showing NG is performed, and the electronic value in the electronic purse is not updated.

Next, the mobile station MS generates a message showing whether a key operation is OK or NG, and gives a time stamp to this message, encrypts with a public encryption key for the electronic bank, and gives a digital signature with a private signature key, and transmits to the electronic bank server EBS. (Step Sd8)

The electronic bank server EBS calculates the electronic value in the electronic bank account for a transfer point, gives a digital signature of the electronic bank server EBS to this electronic value, and stores it as electronic value management information corresponding to the electronic bank account of a transfer point when receiving an Ok message. (Step Sd9)

When an electronic bank account is selected as a transfer means, the electronic bank server EBS calculates the electronic value in the electronic bank account of a transfer means, and stores this value to which a digital signature of the electronic bank server EBS is given as electronic value management information.

The electronic bank server EBS transmits a message showing the process is completed to the mobile station MS. (Step Sd10) The mobile station MS displays this message, and notifies the completion of the process to the user.

Also, the electronic bank server EBS completes a process without updating the electronic value information when receiving an NG message. But, the electronic bank server EBS stores a log about the above process with a digital signature of the mobile station MS to deal with claims, which an OK message has been input to confirm the result and so forth, from a user of the mobile station MS.

Also, for example, when the above transaction cannot be completed for reasons such as the electronic bank server EBS not receiving a message from the mobile station MS in Step Sd8, the electronic bank server EBS encrypts a non-completion message that the transaction is not performed and the electronic value amount in the UIM before the transaction, and transmits this encrypted message and the encrypted value amount to which a digital signature and a time stamp are given, to the mobile station MS as performed in Step Sa8.

On the other hand, the mobile station MS displays this message when receiving a non-completion message from the electronic bank server EBS, and the electronic value amount in the UIM is substituted with the one in the UIM before the transaction transmitted with a non-completion message.

Also, for example, when the mobile station MS cannot receive both the messages (completion and non-completion message) for reasons such as a prolonged communication interception, the mobile station MS displays a message which says transaction is not completed. A user operates the mobile station MS to perform a communicative connection to the electronic bank server EBS after the restoration of communication interception and obtains an updated electronic value information, and updates the electronic value information of a user.

In the above example, the electronic value in the UIM1 of the mobile station MS was described. When an electronic value in a prepaid card PC is transferred, the prepaid card PC has only to go through the same process via the mobile station MS by infrared communication as described above.

C: Application Examples

Next, the application examples of the embodiment will be described.

For example, an item can be sold through cashless transaction by installing a function of an electronic purse corresponding to a UIM1 in a mobile station MS into a vending machine or POS (Point of Sale), and performing an exchange of electronic value between electronic purses by local communication network between mobile station MS (or prepaid card PC) of a user (of vending machine) and the vending machine.

With regard to a vending machine, the correctness is confirmed by verifying the electronic bank signature SGN1 when the electronic value is exchanged with a mobile station MS, so confirming the correctness of the electronic value to the electronic bank server EBS is not needed each time. Accordingly, advantage is that a user can purchase an item immediately, without the vending machine dealer having to pay the communication cost to a server.

Also, an item can be sold by cashless transactions between mobile station MS of a user and a vending machine without installing a function of an electronic purse in the mobile station MS. In this case, the electronic bank signature SGN1 is verified when the electronic value is exchanged with the mobile station MS as well.

Figure 19:
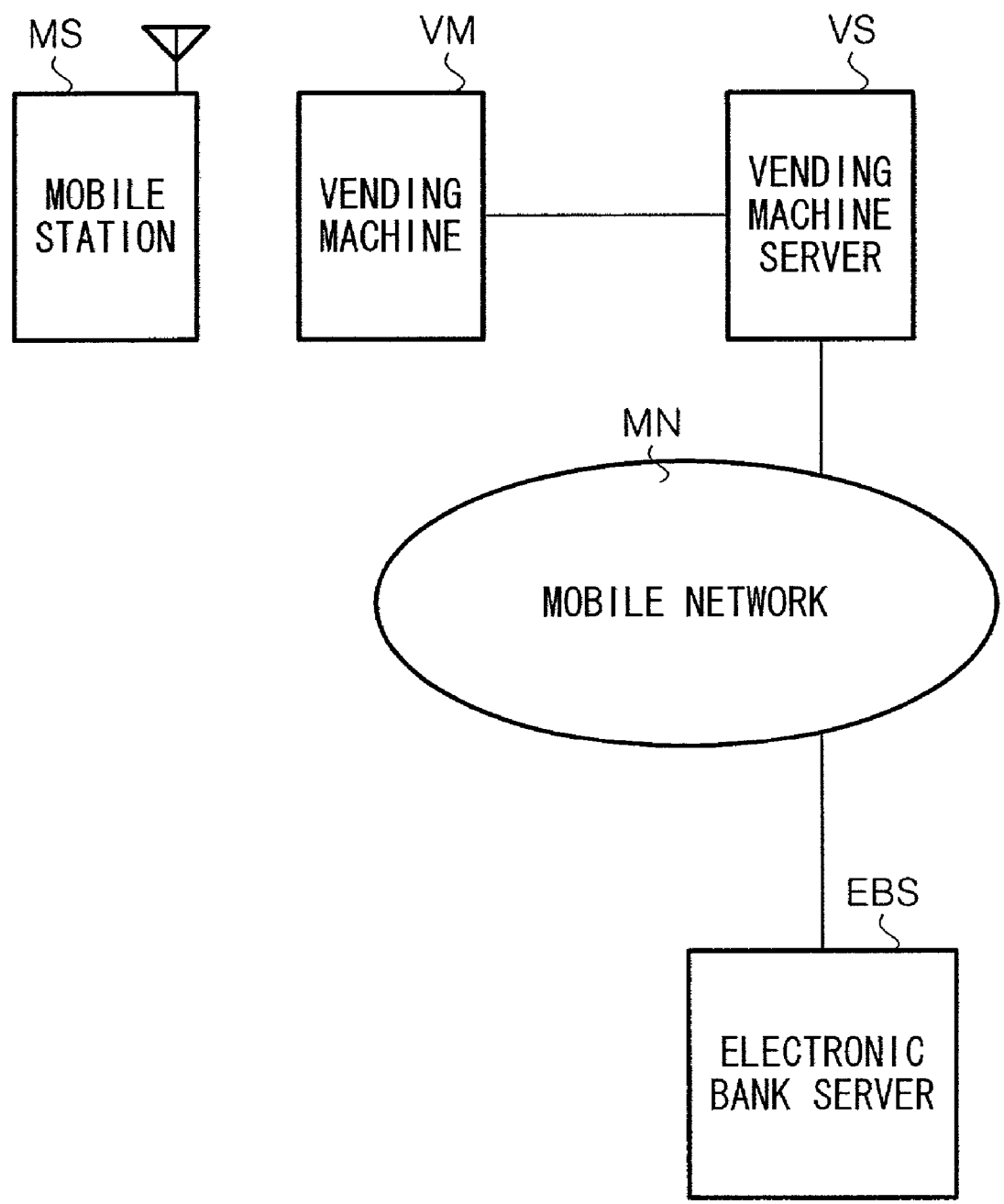
FIG. 19 is a block diagram illustrating the configuration of the overall system according to the embodiment of the present invention in an application example.

FIG. 19 illustrates the above example. A vending machine VM is connected, by wire or radio, to a vending machine server VS connected to a mobile network.

The vending machine VM has a function to perform infrared communication with a mobile station MS, to give a digital signature to the data to be transmitted to the mobile station MS, and to verify the electronic bank signature SGN1 transmitted from the mobile station MS.

The mobile station MS1 of a user receives an electronic bank account number of a vending machine dealer by using infrared communication with the vending machine VM.

A user inputs the amount of electronic value money to be paid to a vending machine VM and the electronic purse type into the mobile station MS, and operates the mobile station MS to show the payment request. The mobile station MS accepts this operation.

The mobile station MS organizes the electronic bank account number of a vending machine dealer, the electronic bank account number of a user, and the electronic value amount to be paid as information set, and transmits this information set to which a digital signature of a user is given to a mobile vending machine VM as electronic value information paid by a user by infrared communication. Also, the electronic bank server ID, the electronic purse type, the electronic bank account number, and the information set of the electronic bank signature SGN1 among the electronic value information stored in an electronic purse of a user are also transmitted to the vending machine VM.

The vending machine VM verifies the electronic bank signature SGN1, and confirms whether a user is the owner of the electronic value issued by a proper electronic bank server EBS. If it fails to verify the digital signature, a transaction to a user will be stopped, and a log of the received information will be taken that there is an improper access.

When the above verification of a digital signature is successful, the vending machine VM confirms that the money information corresponding to the electronic value amount is more than that of the amount of money for an item. If the amount of money is short, the vending machine VM stops the transaction from the mobile station MS, and returns a message showing the money is short to the mobile station MS.

The vending machine VM takes a log as an electronic value update history which is an electronic bank account number of a vending machine dealer, and electronic bank account number of a user, the electronic value amount to be paid, and a digital signature of a user after confirming the above money information.

And, the vending machine VM generates a message that the amount of money for the item is received, and transmits this message with a digital signature to the mobile station MS. A payment for an item to the vending machine VM is completed at this moment, and it enables a user to push an item button to get the item.

And, the mobile station MS updates the electronic value information in the UIM1 based on a message received from vending machine VM. Concretely, deduct amount of money for the item from a current electronic value, and add an electronic bank account number of a vending machine dealer, electronic bank account number of a user, electronic value amount to be paid, and a digital signature of a vending machine VM to the electronic value update history.

The accumulated log in vending machine VM is collected regularly by vending machine server VS, and transmitted to electronic bank server EBS.

Electronic bank server EBS verifies a digital signature of a payer to electronic value update history received from vending machine server VS, and changes the below management information on the electronic value update history.

That is to say, with regard to electronic value management information of electronic bank account of a vending machine VM dealer, electronic bank server EBS adds an electronic value amount in an electronic bank account, and updates a time stamp at update of electronic value amount in electronic bank account. With regard to electronic value management information of electronic bank account and electronic purse of a user, current electronic value amount in UIM1 is deducted, and a time stamp at update of electronic value amount is updated.

When a user pays by prepaid card PC, a current electronic value amount in a prepaid card is deducted, and a time stamp upon update of the electronic value amount is updated.

Also, when electronic bank server EBS fails to perform electronic authentication of a user, a message showing an update of electronic value information is not completed is generated, and transmitted to a manager of electronic bank server EBS.

Electronic bank server EBS updates electronic value management information of electronic bank account of a vending machine VM dealer. That is to say, electronic bank server EBS adds electronic value amount in an electronic bank account to electronic value management information, updates a time stamp at update of electronic value amount, and transmits such information to vending machine server VS.

Also, when electronic bank server EBS fails to perform electronic authentication, the message described above is transmitted to vending machine server VS as well.

Vending machine server VS notifies a message received from electronic bank server EBS to a manager of vending machine server VS by displaying it. If a manager received a message showing failing to perform electronic authentication, a manager may take a legal action and the like if this transaction is recognized to be fraudulent after analyzing this message carefully.

Electronic value information in an electronic purse of a user is updated in the same way already described above like an exchange between electronic purses when a user accesses electronic bank server EBS later, and the process is completed.

When an electronic value update history received from a user is lost by system trouble of vending machine VM or vending machine server VS, the conformity to current electronic value is guaranteed in the same way already described above like when an electronic value update history is lost in an exchange between electronic purses.

According to the above embodiment, it can be detected that an electronic value in an electronic purse is transcribed in an improper way as electronic bank server EBS manages both electronic value of an electronic purse and an electronic bank account.

Also, when an exchange of electronic value is performed between electronic purses in a local way, properness of a digital signature of a user performing a transaction is confirmed only between electronic purses by verifying electronic bank signature EBS, not inquiring electronic bank server EBS every time. Accordingly, network traffic will not increase.

Also, electronic bank server EBS updates electronic value management information which electronic bank server EBS manages by a notification from either one of electronic purses, so the efficiency will improve.

Also, a time stamp is given to electronic bank server EBS in transaction, so an improper retransmission will be prevented.

D: Transformation Examples

As will be apparent from the following descriptions, a variety of modifications are possible with respect to the present invention, and the invention is not to be taken as being limited to the embodiments described.

(1) A Form of Mobile Station MS

Mobile station MS only has to be a portable terminal which has a radio communication function, so it can be a personal computer which performs data communication by connecting to a portable telephone or PDA (Personal Digital Assistance) and so on.

(2) A Communication Configuration of mobile Station, Prepaid Card, Vending Machine.

In the embodiment, mobile station MS, prepaid card PC, vending machine VS perform radio communication each other by using infrared rays, and wire communication is also possible.

For example, mobile station 50 usually comprises a 16-core connector which performs input and output of a serial signal, and prepaid card PC and vending machine VS may also perform data communication by connecting to cable mutually if the same connector is installed in both.

(3) An Installation Configuration of Each Server

In the previous embodiment, electronic bank server EBS was installed on mobile network MN, and registration authority server RA, certificate authority server CA, and directory server DS were installed on internet INET. But, each server can be installed on any network.

(4) Generation of a Key Pair

In the embodiment, registration authority server RA generates a key pair of a user, and transcribes it in UIM1, but it is not limited to this method.

For example, it can be generated in a production factory of UIM1, and transcribed in advance, or it can be performed by a key pair generating function installed in UIM1. Also, registration authority server RA may request an authority like certification authority server CA to generate a key pair, and transmit the key pair.

(5) Storage Capacity of UIM1 or Prepaid Card PC

As described above, an electronic purse such as UIM1 and prepaid card PC about storage capacity has some cases:

For example, all of the electronic value update history may not be stored because of shortage of storage capacity, or a fault may occur in a memory device of electronic value update history because of system trouble. In these cases, electronic value update history may be lost. A part of electronic value update information may be lost by a malicious user as a case like only electronic value update history which a user paid is deleted.

By the way, in the embodiment, when electronic value update history of either a payer or a recipient is transmitted to electronic bank server EBS, both (a payer and a recipient) of the proper electronic value amount are updated.

However, both of the (a payer and a recipient) electronic value update history are lost, electronic bank server EBS cannot understand an exchange of electronic value. In this case, to assume that a transaction is not performed from the beginning, current electronic value amount in UIM in each electronic purse is obliged to conform to electronic value amount of an electronic purse which electronic bank server EBS manages at the moment when each electronic purse accesses electronic bank server EBS after transaction. That is to say, electronic value information of an electronic purse is conformed to the electronic value information of an electronic bank. If a means to guarantee conformity is comprised as described above, mobile station MS can delete electronic value update history from the older date one in transaction by using electronic value after that when detecting to accumulate electronic value update history corresponding in volume to storage capacity of an electronic purse.

Also, mobile station MS may be obliged to transmit the electronic value update history to electronic bank server EBS when searching to accumulate the electronic value update history corresponding in volume to a storage capacity of an electronic purse. The electronic value information of the electronic purse will be the same as the one of an electronic bank by the above. Also, mobile station MS may not perform a transaction using an electronic value after searching to accumulate an electronic value update history corresponding to storage capacity of an electronic purse. In this case, mobile station MS performs a process to display this transaction message on display; and notify it to a user.

(6) A Communication Means Between Mobile Station MS and Prepaid Card

A local communication means between mobile station MS and prepaid card PC is not only limited to infrared communication described above, for example, Bluetooth communication (registered trademark), can also be used. Of course, a local communication means between mobile station MS and vending machine VM can be performed by any other radio communication means, not only by infrared communication.

The invention claimed is:

1. An electronic value system for performing transmission and reception of an electronic value which comprises electronic money information between a first communication terminal and a second communication terminal, said first communication terminal comprising:
- a first memory for storing an electronic value, identification information of an issuer of said electronic value, and a digital signature provided by said issuer to said identification information; and
- a first transmission means for transmitting said identification information and said digital signature together with said electronic value to said second communication terminal;
- a first receiving means for receiving from said second communication terminal identification information of an issuer and a digital signature before transmitting said electronic value to said second communication terminal; and
- a first confirmation means for confirming authenticity of said second communication terminal by checking said digital signature received from said second communication terminal to determine that said electronic value has been issued by said issuer, said second communication terminal comprising:
- a second memory for storing an electronic value, identification information of an issuer of said electronic value, and a digital signature provided by said issuer to said identification information;
- a second transmission means for transmitting said identification information and said digital signature that are stored in said second memory to said first communication terminal;
- a second receiving means for receiving identification information of an issuer and a digital signature from said first communication terminal; and
- a confirmation means for confirming that said electronic value has been issued by the issuer.

2. An electronic value system according to claim 1, wherein said first communication terminal and said second communication terminal comprise a log accumulation means for accumulating a transaction log related to their own transaction; and wherein at least either said first communication terminal or said second communication terminal transmits a transaction log accumulated at said log to a node that manages balance information of said electronic value, which information said first or said second communication terminal memorizes, when said accumulated transaction log is equal in volume to a storage capacity of said log accumulation means.

3. An electronic value system according to claim 1, wherein said first communication terminal and said second communication terminal perform transmission and reception of electronic value by radio.

4. An electronic value system according to claim 1, wherein at least either said first communication terminal or said second communication terminal is a mobile communication terminal in a mobile network.

5. An electronic value system according to claim 1, wherein said second communication terminal is installed in a vending machine.

6. An electronic value system according to claim 1, wherein the first communication terminal attaches a transmission date and time to said electronic value when transmitting said value.

7. An electronic value system according to claim 1, wherein said first communication terminal comprises a security means for performing electronic authentication, encryption and decryption by using a key for said electronic value, and an update means for updating said key regularly when performing transmission and reception of said electronic value.

* * * * *